United States Patent
Kang

(10) Patent No.: US 7,133,095 B2
(45) Date of Patent: Nov. 7, 2006

(54) COLOR FILTER SUBSTRATE HAVING COLOR FILTER PORTIONS OF DIFFERENT THICKNESS, AND OVERCOATING LAYER ON COMMON ELECTRODE, LCD HAVING THE SAME, AND METHOD OF MANUFACTURING

(75) Inventor: Seung-Gon Kang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 129 days.

(21) Appl. No.: 10/785,911

(22) Filed: Feb. 24, 2004

(65) Prior Publication Data
US 2005/0122450 A1   Jun. 9, 2005

(30) Foreign Application Priority Data
Dec. 5, 2003   (KR)   ................... 10-2003-0088232

(51) Int. Cl.
*G02F 1/1335*   (2006.01)
(52) U.S. Cl. ................... 349/114; 349/106; 349/107; 349/138
(58) Field of Classification Search ................ 349/107, 349/114
See application file for complete search history.

(56) References Cited

U.S. PATENT DOCUMENTS

| | | | |
|---|---|---|---|
| 6,356,335 B1 * | 3/2002 | Kim et al. | 349/156 |
| 6,850,298 B1 * | 2/2005 | Fujimori et al. | 349/114 |
| 7,015,996 B1 * | 3/2006 | Sakamoto et al. | 349/113 |
| 2002/0036730 A1 * | 3/2002 | Baek et al. | 349/106 |
| 2003/0063244 A1 * | 4/2003 | Fujimori et al. | 349/113 |
| 2003/0160914 A1 * | 8/2003 | Ha | 349/106 |
| 2004/0032552 A1 * | 2/2004 | Kim | 349/113 |
| 2004/0080684 A1 * | 4/2004 | Rho | 349/106 |

* cited by examiner

*Primary Examiner*—Andrew Schechter
(74) *Attorney, Agent, or Firm*—Cantor Colburn LLP

(57) ABSTRACT

A color filter substrate includes a substrate, a color filter and a common electrode. The substrate includes a transmissive region and a reflective region adjacent to the transmissive region. The color filter is formed on the substrate, and the color filter includes a first portion formed in the transmissive region, and a second portion formed in the reflective region. The first and second portions have different thickness each other. The common electrode is disposed on the color filter. The common electrode includes a third portion formed in the transmissive region, and a fourth portion formed in the reflective region. The third portion and the fourth portion have different height each other with respect to the substrate. Thus, a luminance becomes uniform, even though a light passes through the liquid crystal layer of the reflective region twice, and a light passes though the liquid crystal layer of the transmissive region once.

28 Claims, 28 Drawing Sheets

COLOR FILTER SUBSTRATE HAVING COLOR FILTER PORTIONS OF DIFFERENT THICKNESS, AND OVERCOATING LAYER ON COMMON ELECTRODE, LCD HAVING THE SAME, AND METHOD OF MANUFACTURING

CROSS-REFERENCE TO RELATED APPLICATIONS

This application relies for priority upon Korean Patent Application No.2003-88232 filed on Dec. 5, 2003, the contents of which are herein incorporated by reference in its entirety.

BACKGROUND OF THE INVENTION

1. Field of the Invention

The present invention relates to a color filter substrate, a liquid crystal display panel, liquid crystal display apparatus and a method of manufacturing the color filter substrate. More particularly, the present invention relates to a color filter substrate having enhanced luminance, a liquid crystal display panel, liquid crystal display apparatus having the color filter substrate, and a method of manufacturing the color filter substrate for reducing cost.

2. Description of the Related Art

A liquid crystal display apparatus includes an array substrate having a thin film transistor, a color filter substrate and a liquid crystal layer interposed between the array substrate and the color filter substrate. Liquid crystal material in the liquid crystal layer has anisotropic dielectric constant and anisotropic transmittance. Thus, when electric fields are applied to the liquid crystal layer, liquid crystal molecules in the liquid crystal layer are rearranged, so that transmittance of a light is adjusted to display an image.

Generally, liquid crystal material does not emit a light. Thus, the liquid crystal display apparatus uses an ambient light or a light generated from an internal device of the liquid crystal display apparatus to display an image.

When the liquid crystal display apparatus of a mobile equipment uses only light generated from an internal device, a size of a battery for supplying power increases, leading to increase a size of the mobile equipment. When the liquid crystal display apparatus uses only an ambient light, the liquid crystal display apparatus may not display an image in a dark place. However, when the liquid crystal display apparatus uses both the light generated from the internal device and the ambient light, problems of above may be solved.

General reflective transmissive type liquid crystal display apparatus includes a liquid crystal display panel, an optical film assembly and a backlight assembly.

The liquid crystal display panel includes a color filter substrate, an array substrate and a liquid crystal layer. The color filter substrate includes a color filter and a common electrode. The array substrate includes a reflective electrode, a transparent electrode and a thin film transistor. The liquid crystal layer is interposed between the array substrate and the color filter substrate. The optical film assembly includes a polarizer and a compensating film. The backlight assembly is disposed under the liquid crystal display panel to provide the liquid crystal display panel with light.

The liquid crystal may be aligned in various ways. Thus, the liquid crystal display apparatus may be classified into twisted nematic (TN) mode, super twisted nematic (STN) mode, mixed twisted nematic (MTN) mode, vertical alignment (VA) mode or electrically controlled birefringence (ECB) mode in accordance with an alignment of the liquid crystal.

The color filter allows a light having a wavelength corresponding to a color of the color filter to pass through the color filter. Thus, when a light passes through the color filter, a luminance decreases.

An external light that enters the liquid crystal display apparatus passes through the color filter and the liquid crystal layer to be reflected on the reflective electrode. Thus, the reflected light passes through the liquid crystal layer and the color filter again to exit the liquid crystal display apparatus. Thus, the external light passes through the liquid crystal layer and the color filter twice.

A light generated from the backlight assembly passes through the transparent electrode, the liquid crystal layer and the color filter to exit the liquid crystal display apparatus. Thus, the light generated from the backlight assembly passes through the liquid crystal layer and the color filter once.

When a light passes through color filter, a luminance of the light decreases. Thus, the luminance of the light that is reflected from the reflective electrode is lower than the luminance of the light that passes through the transparent electrode.

Korea Laid Open Patent Publication number 2001-0055636 discloses a color filter substrate including a color filter that has different thickness. That is, the color filter has first and second portions corresponding to the transparent electrode and the reflective electrode, respectively, and the first portion is thicker than the second region.

However, the light reflected from the reflective electrode passes through the liquid crystal layer twice, and the light passing through the transparent electrode passes trough the liquid crystal layer once. Thus, an optical condition of the light reflected from the reflective electrode is different from the optical condition of the light that passes through the transparent electrode, so that a display quality is deteriorated.

SUMMARY OF THE INVENTION

The present invention provides a color filter substrate that has enhanced uniformity of luminance, and requires lower manufacturing cost.

The present invention also provides a method of manufacturing the color filter substrate.

The present invention also provides a liquid crystal display panel that includes the color filter substrate.

The present invention also provides a method of manufacturing the liquid crystal display panel.

The present invention also provides a liquid crystal display apparatus that includes the color filter substrate.

In an exemplary color filter substrate according to the invention, the color filter substrate includes a substrate, a color filter and a common electrode. The substrate includes a transmissive region and a reflective region that is adjacent to the transmissive region. The color filter is formed on the substrate, and the color filter includes a first portion formed in the transmissive region, and a second portion formed in the reflective region. The first and second portions have different thickness from each other. The common electrode is disposed on the color filter. The common electrode includes a third portion formed in the transmissive region, and a fourth portion formed in the reflective region. The third portion and the fourth portion have different height from each other with respect to the substrate.

In an exemplary method of manufacturing the color filter substrate, a color filter is formed on a substrate that includes a transmissive region and a reflective region adjacent to the transmissive region. The color filter includes a first portion formed in the transmissive region, and a second portion formed in the reflective region. The first and second portions have different thickness from each other. Then, a common electrode is formed on the color filter. The common electrode includes a third portion formed in the transmissive region, and a fourth portion formed in the reflective region. The third portion and the fourth portion have different height from each other with respect to the substrate.

In an exemplary liquid crystal display panel according to the invention, the liquid crystal display panel includes a first substrate, a second substrate and a liquid crystal layer. The first substrate includes a substrate, a color filter and a common electrode. The substrate includes a transmissive region and a reflective region that is adjacent to the transmissive region. The color filter is formed on the substrate, and the color filter includes a first portion formed in the transmissive region and a second portion formed in the reflective region. The first and second portions have different thickness from each other. The common electrode is disposed on the color filter, and the common electrode includes a third portion formed in the transmissive region and a fourth portion formed in the reflective region. The third portion and the fourth portion have different height from each other with respect to the substrate. The second substrate faces the first substrate. The liquid crystal layer is interposed between the first and second substrates.

In an exemplary method of manufacturing the liquid crystal display panel, a first substrate is formed. The first substrate includes a substrate, a color filter and a common electrode. The substrate includes a transmissive region and a reflective region that is adjacent to the transmissive region. The color filter is formed on the substrate, and the color filter includes a first portion formed in the transmissive region, and a second portion formed in the reflective region. The first and second portions have different thickness from each other. The common electrode is disposed on the color filter. The common electrode includes a third portion formed in the transmissive region, and a fourth portion formed in the reflective region. The third portion and the fourth portion have different height from each other with respect to the substrate. Additionally, a second substrate is formed. Then, the first and second substrates are assembled together, and a liquid crystal layer is formed between the first and second substrates.

In an exemplary liquid crystal display apparatus according to the invention, the liquid crystal display apparatus includes a first substrate, a second substrate, a liquid crystal layer, an upper optical film assembly and a lower optical film assembly. The first substrate includes a substrate, a color filter and a common electrode. The substrate includes a transmissive region and a reflective region that is adjacent to the transmissive region. The color filter is formed on the substrate, and the color filter includes a first portion formed in the transmissive region and a second portion formed in the reflective region. The first and second portions have different thickness from each other. The common electrode is disposed on the color filter, and the common electrode includes a third portion formed in the transmissive region and a fourth portion formed in the reflective region. The third portion and the fourth portion have different height from each other with respect to the substrate. The second substrate faces the first substrate. The liquid crystal layer is interposed between the first and second substrates. The second substrate faces the first substrate. The liquid crystal layer is interposed between the first and second substrates. The upper optical film assembly is disposed on the upper surface of the first substrate. The upper optical film assembly includes an upper quarter-wave plate and an upper polarizer that is disposed on the upper quarter-wave plate. The lower optical film assembly is disposed on the lower surface of the second substrate. The lower optical film assembly includes a lower quarter-wave plate and a lower polarizer that is disposed on the lower quarter-wave plate.

According to the present invention, the color filter substrate includes color filters of which thickness is different according to the regions. That is, the color filter of the transmissive region is thicker than the color filter of the reflective region, so that a distance between the reflective electrode and the common electrode is larger than a distance between the transparent electrode and the common electrode. Thus, electric fields of the transmissive region are stronger than electric fields of the reflective region. Therefore, even though an external light passes through the liquid crystal layer of the reflective region twice and a light generated from a backlight assembly passes through the liquid crystal layer of the transmissive region once, the luminance becomes uniform.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE PREFERRED EMBODIMENTS

Hereinafter the preferred embodiments of the present invention will be described in detail with reference to the accompanied drawings.

Liquid Crystal Display Apparatus Including a Color Filter Having Slit.

Figure 1:
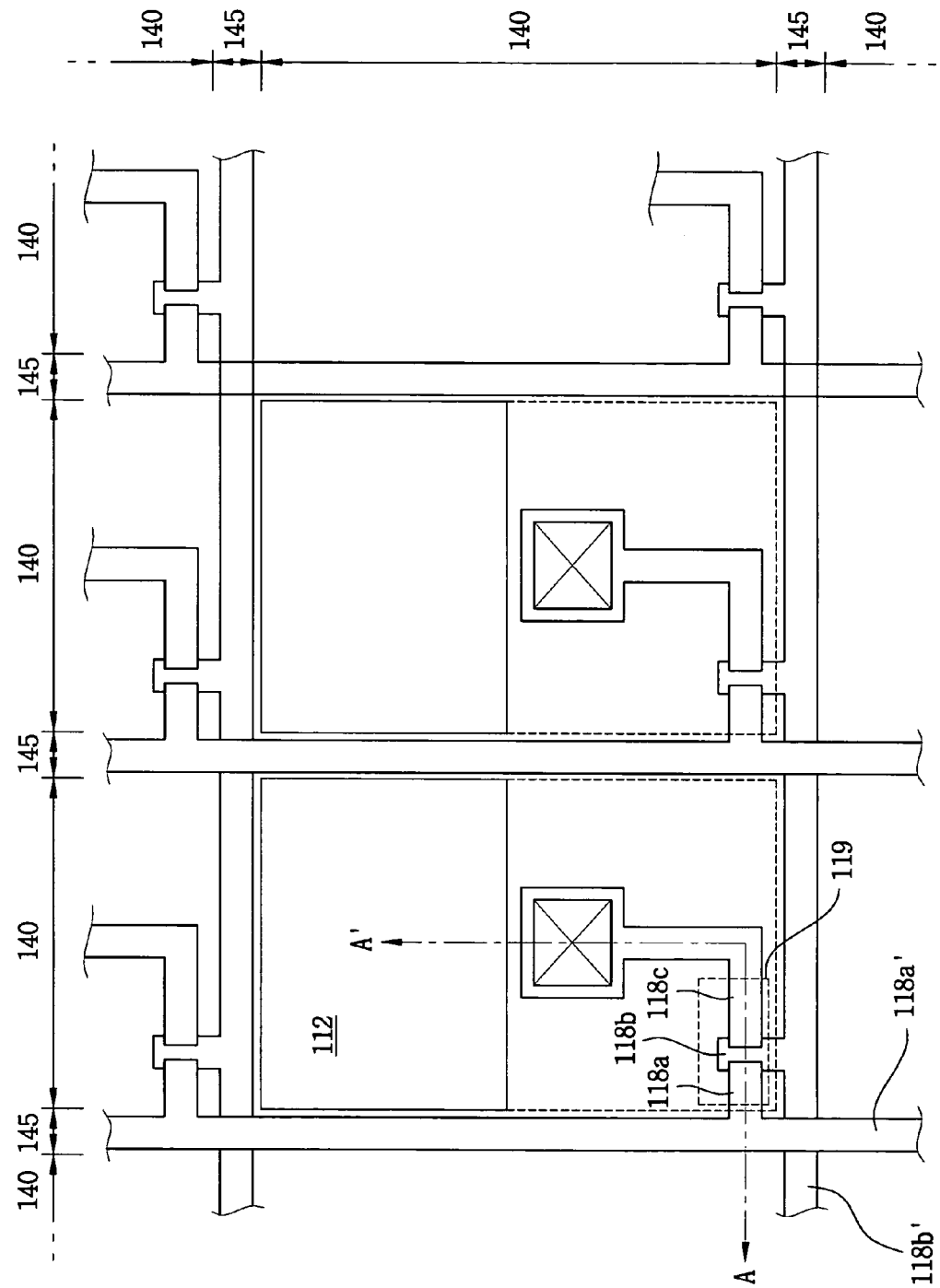
FIG. 1 is a schematic view showing a liquid crystal display apparatus having a common electrode of which thickness is different.
Figure 2:
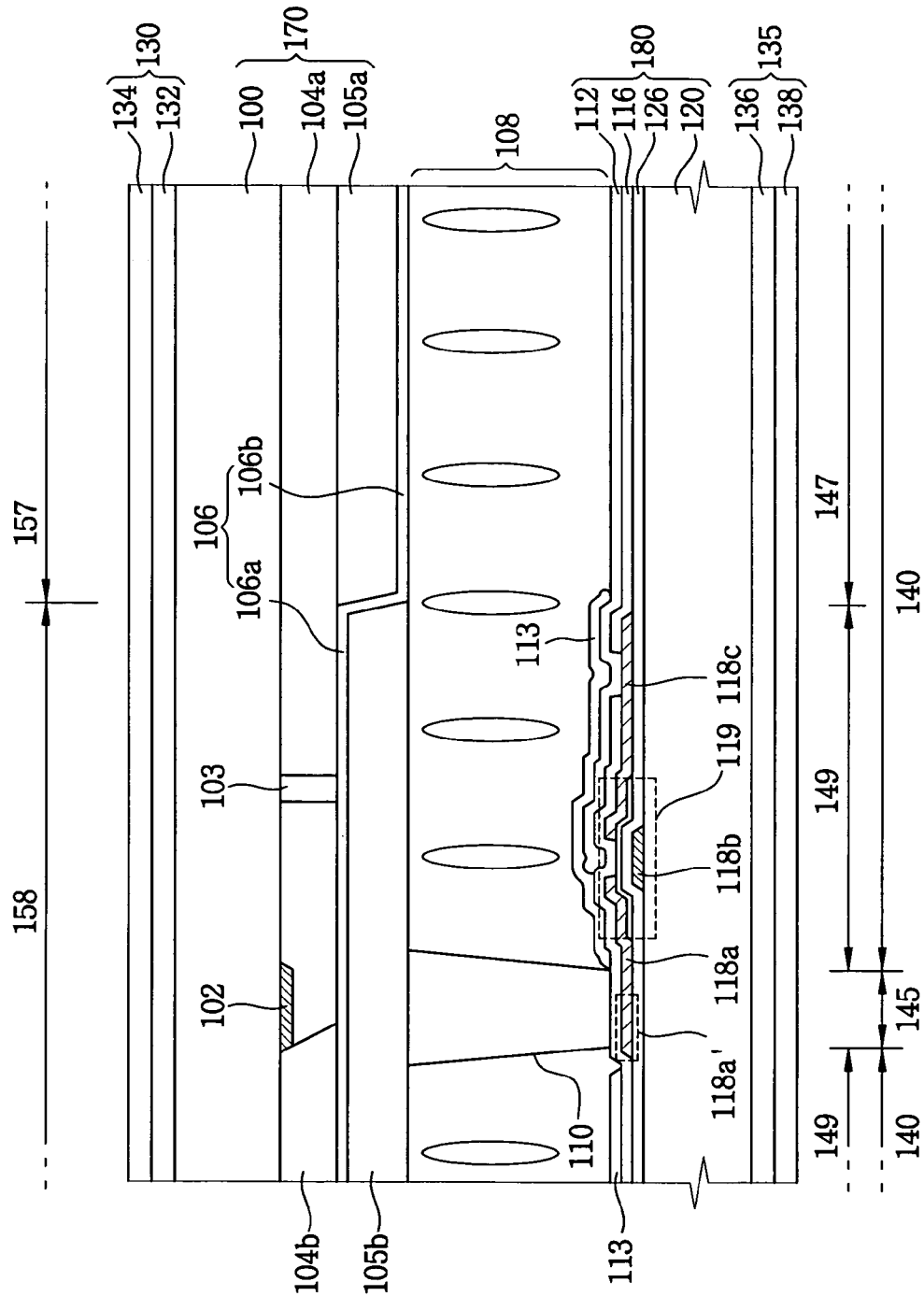
FIG. 2 is a cross-sectional view taken along the line A–A' of FIG. 1.

FIG. 1 is a schematic view showing a liquid crystal display apparatus having a common electrode of which thickness is different, and FIG. 2 is a cross-sectional view taken along the line A–A' of FIG. 1.

Referring to FIGS. 1 and 2, a liquid crystal display apparatus includes a liquid crystal display panel, upper and lower optical film assemblies 130 and 135, respectively.

The liquid crystal display panel includes first and second substrates 170 and 180, and a liquid crystal layer 108. The first substrate 170 includes an upper substrate 100, a black matrix 102, color filters 104a and 104b, overcoating layers 105a and 105b, a common electrode 106 and a spacer 110. The first substrate 170 includes transmissive and reflective regions 157 and 158. The second substrate 180 includes a lower substrate 120, a thin film transistor 119, a gate insulation layer 126, a passivation layer 116, an organic layer 114, a transparent electrode 112 and a reflective electrode 113. The second substrate 180 includes a pixel region 140 and a light blocking region 145.

The liquid crystal display apparatus displays an image by adjusting the arrangement of liquid crystal molecules of the liquid crystal layer 108. The pixel region 140 includes a reflective electrode region 149 and a transparent electrode region 147. The reflective electrode reflects an external light that enters the liquid crystal display panel, and the transparent electrode allows the light that is generated from the backlight assembly to pass through the transparent electrode.

The transmissive region 157 corresponds to the transparent electrode region 147, and the reflective region 158 corresponds to the light blocking region 145 and the reflective electrode region 149. The reflective region 158 is also adjacent to the transmissive region 157. The reflective region 158 may correspond only to the reflective electrode region 149.

The thin film transistor 119, a portion of the transparent electrode 112 and the reflective electrode 113 are disposed in the reflective electrode region 149, and a remaining portion of the reflective electrode 112 is disposed in the transparent electrode region 147.

The light blocking region 145 is adjacent to the pixel region 140. A source line 118a', a gate line 118b and a driving circuit (not shown) are disposed in the light blocking region 145.

The black matrix 102 is formed on the upper substrate, such that the black matrix 102 is disposed in the light blocking region 145.

The color filters 104a and 104b are formed on the upper substrate 100 having the black matrix 102 formed thereon, such that the color filters 104a and 104b allow a light having a specific wavelength to transmit. The color filters 104a and 104b includes slit 103 for enhancing transmissivity. The slit 103 is disposed over the reflective electrode 113.

The overcoating layers 105a and 105b, and the common electrode 106 are alternately disposed on the upper substrate 100 having the black matrix 102, and the color filters 104a and 104b formed thereon. The common electrode 106b corresponding to the transmissive region 157 is disposed on the overcoating layer 105a that is disposed on the color filter 104a. However, the common electrode 106a corresponding to the reflective region 158 is disposed between the color filters 104a and 104b, and the overcoating layer 105b.

Thus, even though a cell gap of the reflective electrode region 149 is substantially same as a cell gap of the transparent electrode region 147, a difference in the heights of the common electrodes 106a and 106b leads to form different electric fields between the reflective electrode region 149 and the transparent electrode region 147.

The overcoating layers 105a and 105b protect the color filters 104a and 104b, and the overcoating layers 105a and 105b planarize a stepped portion formed between the black matrix 102 and the color filters 104a and 104b.

The spacer 110 is formed on the upper substrate 100 having the black matrix 102, the color filters 104a and 104b, the overcoating layers 105a and 105b, and the common electrode 106 formed thereon.

The thin film transistor 119 that is formed on the lower substrate 120, includes a source electrode 118a, a gate electrode 118b, a drain electrode 118c and semiconducting layer pattern.

The driving circuit (not shown) applies a data voltage to the source electrode 118a via the source line 118a'. The driving circuit (not shown) also applies a scan signal to the gate electrode 118b via the gate line 118b'.

The storage capacitor (not shown) is formed on the lower substrate 120, such that the storage capacitor maintains voltage between the common electrode 106 and the reflective electrode 113, or between the common electrode 106 and the transparent electrode 112.

The gate insulation layer 126 is formed on the lower substrate 120 having the gate electrode 118b formed thereon, so that the gate insulation layer 126 is electrically insulates the gate electrode 118b from the source and drain electrodes 118a and 118c.

The passivation layer 116 is formed on the lower substrate 120 having the thin film transistor 119 formed thereon, and the passivation layer 116 includes a contact hole for exposing a portion of the drain electrode 118c.

The transparent electrode 112 is formed on the passivation layer 116 and an inner wall of the contact hole, so that the transparent electrode 112 is electrically connected to the drain electrode 118c.

The reflective electrode 113 is disposed on the passivation layer 116 and a portion of the transparent electrode 112. The reflective electrode 113 reflects an external light.

The driver circuit (not shown) applies data voltage to the transparent and reflective electrodes 112 and 113 via the thin film transistor 119 to form electric fields between the common electrode 116a and the reflective electrode 113 and between the common electrode 116b and the transparent electrode 112.

The liquid crystal layer 108 is interposed between the first and second substrates 170 and 180, and the liquid crystal display layer 108 is sealed by sealant (not shown).

A rubbing layer (not shown) may be formed on the first and second substrates 170 and 180 to align liquid crystal molecules of the liquid crystal layer 108. Rubbing is applied to the surface of the rubbing layer (not shown).

The upper optical film assembly 130 includes an upper quarter-wave plate 132 and the upper polarizer 134. The upper quarter-wave plate 132 is disposed on an upper face of the upper substrate 100, and the upper quarter-wave plate 132 delays a phase of a light that passes through the upper quarter-wave plate 132 by λ/4. The upper polarizer 134 is disposed on the upper quarter-wave plate 132 to polarize the light that passes through the upper quarter-wave plate 132.

The lower optical film assembly 135 includes a lower quarter-wave plate 136 and the lower polarizer 138. The lower quarter-wave plate 136 is disposed on an lower face of the lower substrate 120, and the lower quarter-wave plate 136 delays a phase of a light that passes through the lower quarter-wave plate 136 by λ/4. The lower polarizer 138 is disposed on the lower quarter-wave plate 136 to polarize the light that passes through the lower quarter-wave plate 136.

FIGS. 3A to 3I are cross-sectional views showing a process of manufacturing the liquid crystal display apparatus of FIG. 1.

Figure 3A:
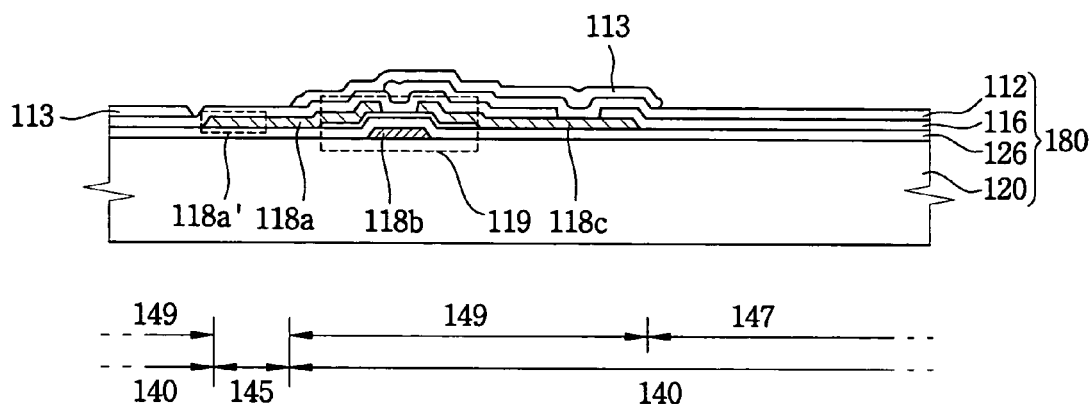
FIGS. 3A to 3I are cross-sectional views showing a process of manufacturing the liquid crystal display apparatus of FIG. 1.

Referring to FIG. 3A, a pixel region 140 for displaying an image and a light blocking region 145 for blocking a light are defined on a lower substrate 120. Additionally, a reflective electrode region 149 and a transparent electrode region 147 are defined in the pixel region 140.

Then, a thin film transistor 119, a gate line 118b' and a source line 118a' are formed on the lower substrate 120.

Then, a passivation layer 116 having a contact hole for exposing the drain electrode 118c of the thin film transistor 119 is formed on the lower substrate 120 having the thin film transistor 119 formed thereon.

Then, a transparent electrode 112 and the reflective electrode 113 are formed on the passivation layer 116.

Thus, a second substrate 180 including the lower substrate 120, the thin film transistor 119, the source line 118a', the gate line 118b', the transparent electrode 112 and the reflective electrode 113 is completed.

Figure 3B:
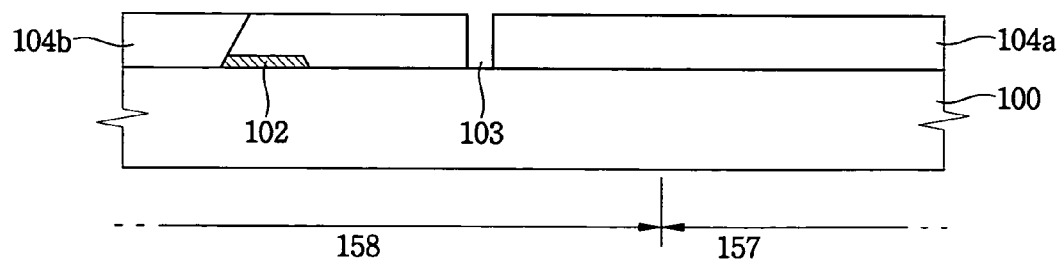

Referring to FIG. 3B, a black matrix 102 is formed on an upper substrate 100, such that the black matrix is disposed over the light blocking layer 145. Then, color filters 104a and 104b including a slit 103 are formed on the upper substrate 100 having the black matrix 102 formed thereon. The slit 103 is disposed over the reflective electrode region 149.

Figure 3C:
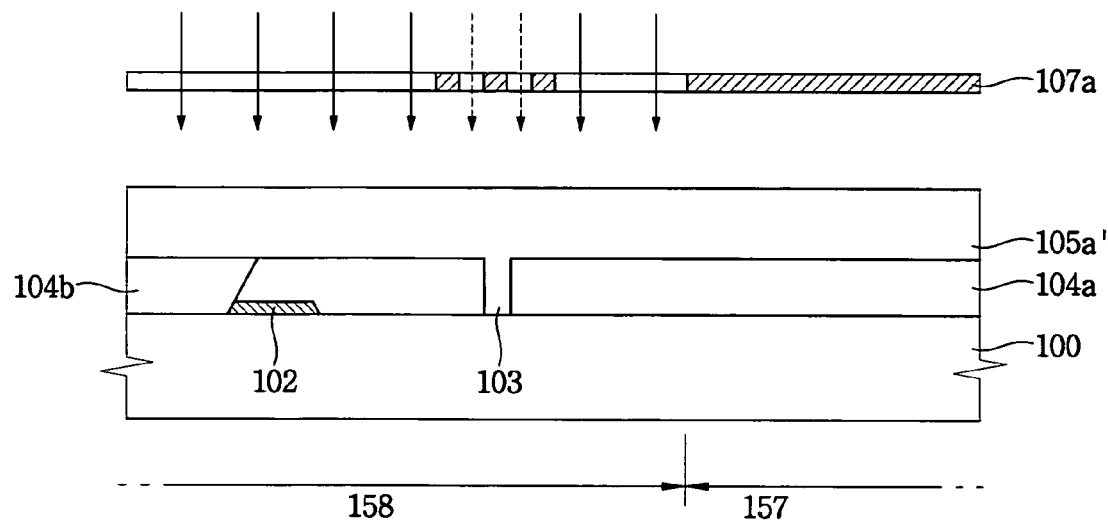

Referring to FIG. 3C, a transparent thermosetting plastic including photoresist is coated on the upper substrate 100 having the color filters 104a and 104b formed thereon. Then, the thermosetting plastic is exposed via a mask 107a. The mask 107a has an opening corresponding to the reflective region 158. A portion of the mask 107a corresponding to the slit 103 includes slit or half tone, so that only a portion of the light may pass through the mask 107a.

Figure 3D:
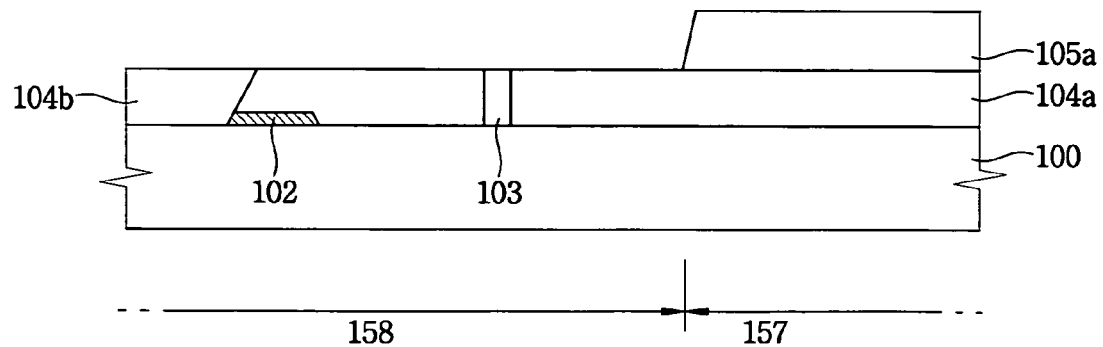

Referring to FIG. 3D, the thermosetting plastic is developed to form the slit 103, and the overcoating layer 105a is formed in the transmissive region 157.

Figure 3E:
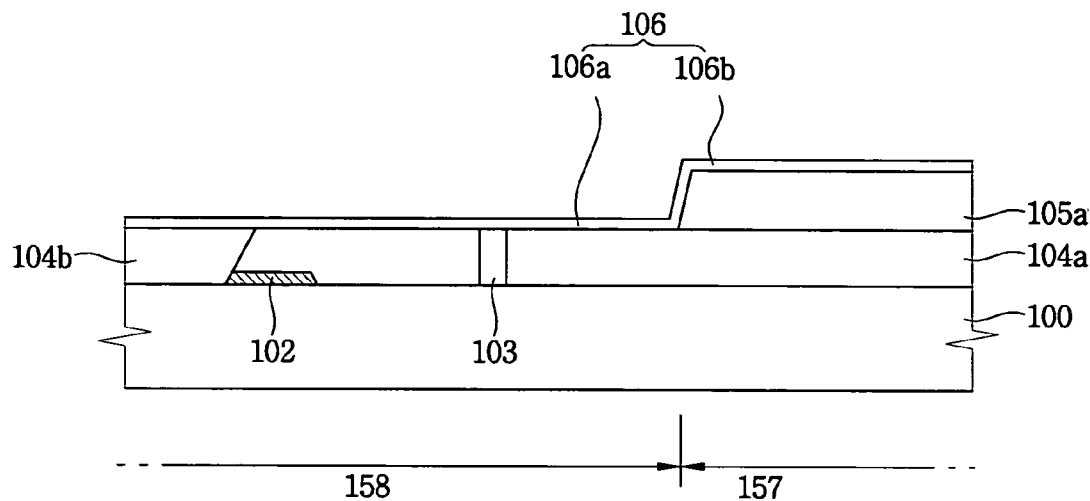

Referring to FIG. 3E, an optically transparent and electrically conductive material is coated on the upper substrate 100 having the black matrix 102, the color filters 104a and 104b, and the overcoating layer 105a formed thereon to form the common electrode 106. The common electrode 106 has different heights in accordance with regions. A height of a portion 106a of the common electrode 106, which is formed in the reflective region 158, is different from a height of a portion 106b which is formed in the transmissive region 157.

Figure 3F:
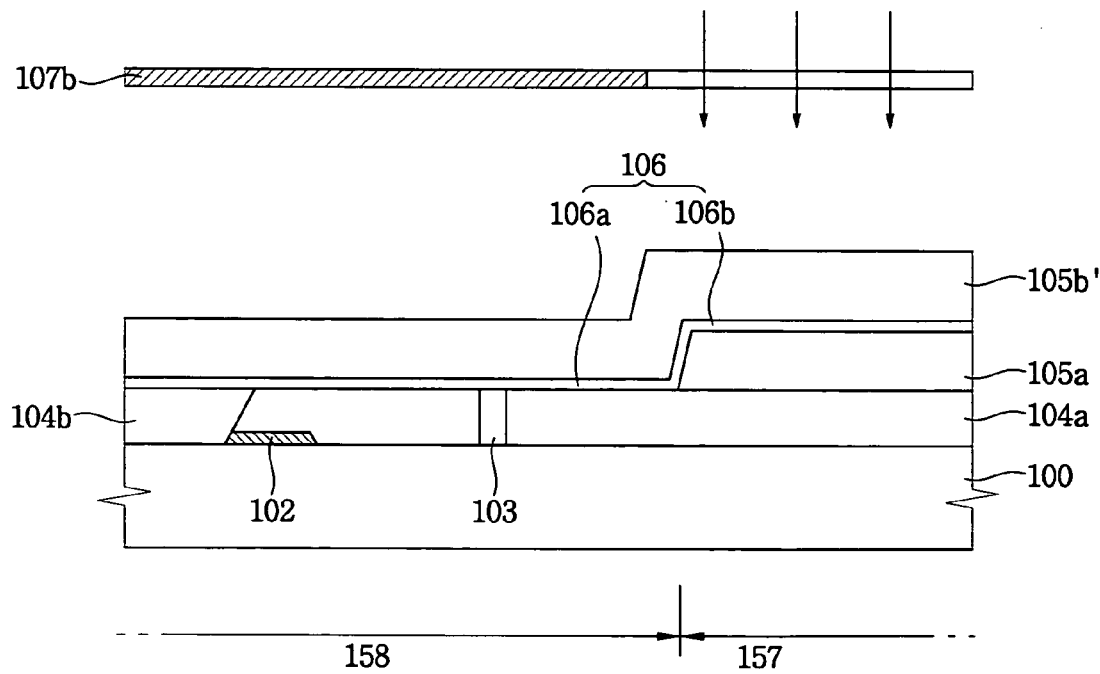

Referring to FIG. 3F, the thermosetting plastic 105b' is coated on the common electrode 106. Then, the thermosetting plastic 105b' is exposed via a mask 107b that exposes the transmissive region 157. The thermosetting plastic 105b' may be substantially identical with the thermosetting plastic 105a' of FIG. 3C, or the thermosetting plastic 105b' may be different from the thermosetting plastic 105a' of FIG. 3C.

Figure 3G:
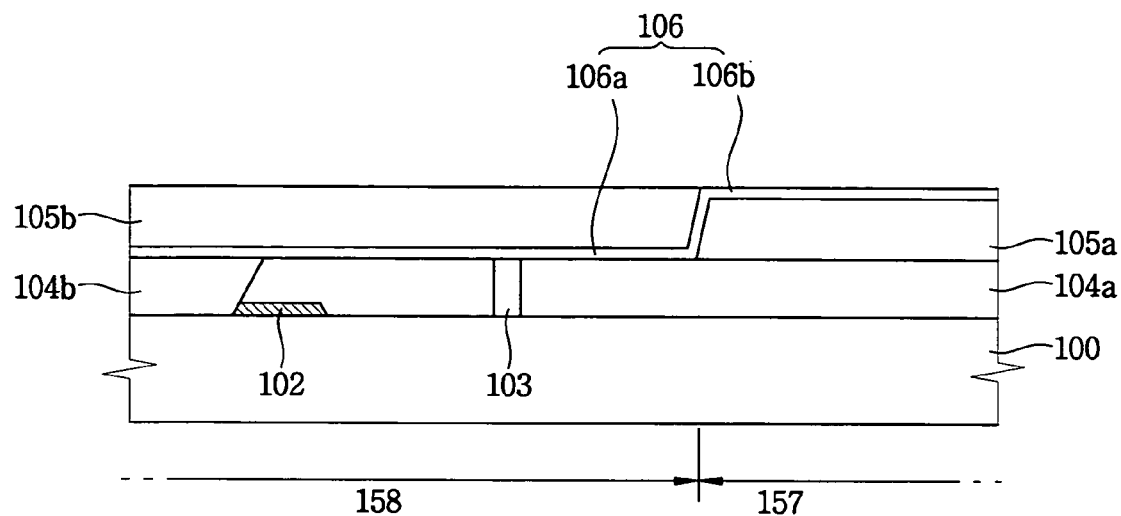

Referring to FIG. 3G, the thermosetting plastic 105b' is developed to form the overcoating layer 105b that planarizes a stepped portion of the common electrode 106.

Figure 3H:
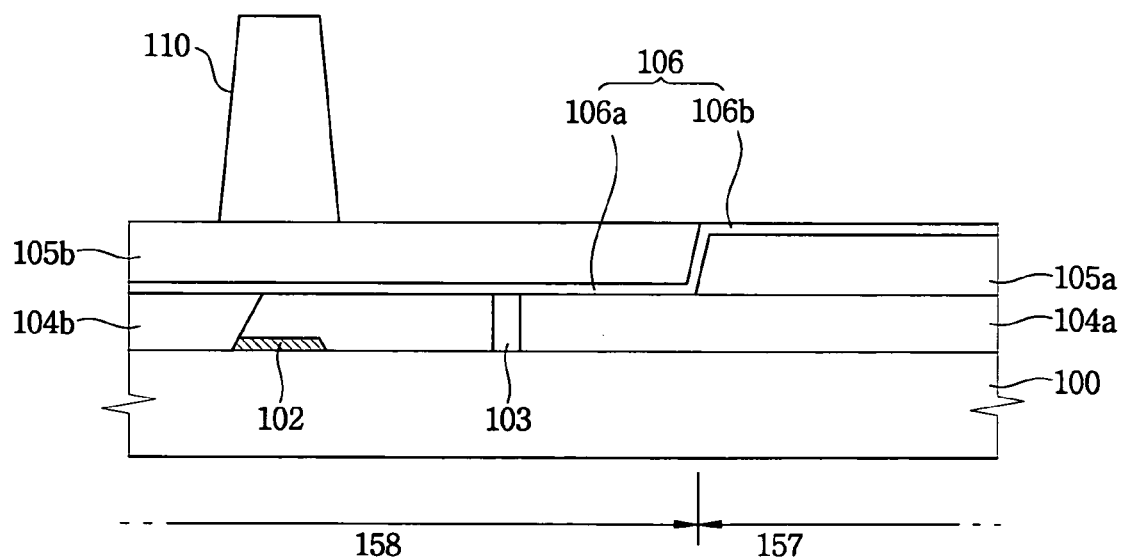

Referring to FIG. 3H, a spacer 110 is formed on the upper substrate 100 having common electrode 106 and overcoating layer 105b. Thus, the first substrate 170 including the color filters 104a and 104b, the overcoating layers 105a and 105b, the common electrode 106, and the spacer 110 is formed.

Figure 3I:
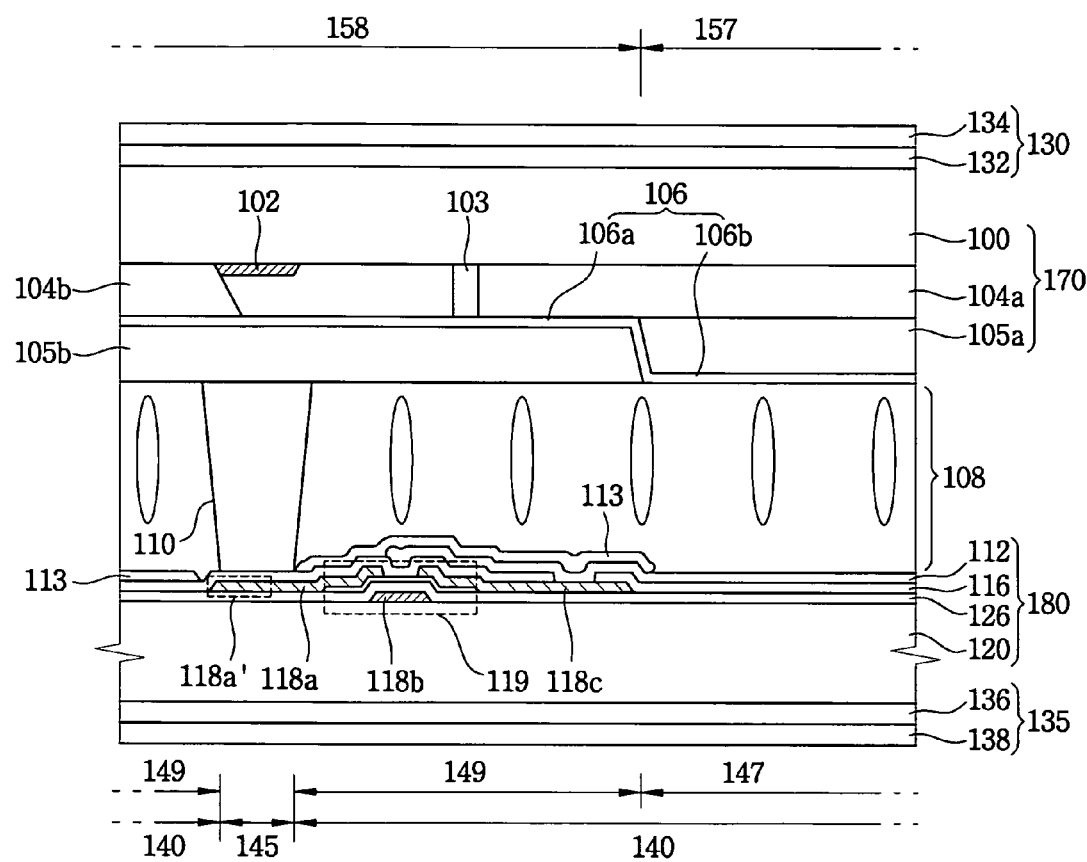

Referring to FIG. 3I, the first and second substrates 170 and 180 are assembled together, and liquid crystal material is injected into between the first and second substrates 170 and 180 to form the liquid crystal layer 108. Thus, liquid crystal display panel is completed.

Then, the upper quarter-wave plates 132 and the upper polarizer 134 are attached on the upper surface of the liquid crystal display panel to form the upper optical film assembly 130, and the lower quarter-wave plates 136 and the lower polarizer 138 are attached on the lower surface of the liquid crystal display panel to form the lower optical film assembly 135.

Thus, the slit 103 formed in the reflective electrode region 149 enhances a luminance of a light that is reflected on the reflective electrode 113. Additionally, the common electrode 106 that has different height at the reflective electrode region 149 and the transparent electrode region optimizes an optical condition of the liquid crystal layer 108 corresponding to the reflective electrode region 149 and the transparent electrode region 147.

However, a process of forming the overcoating layers 105a and 105b, and the common electrode 106 alternately is so complex that the process may increase manufacturing cost. Thus, productivity is lowered. Additionally, a portion of the common electrode 106, which is adjacent to the slit 103 may have irregular shape.

Embodiment 1

Figure 4:
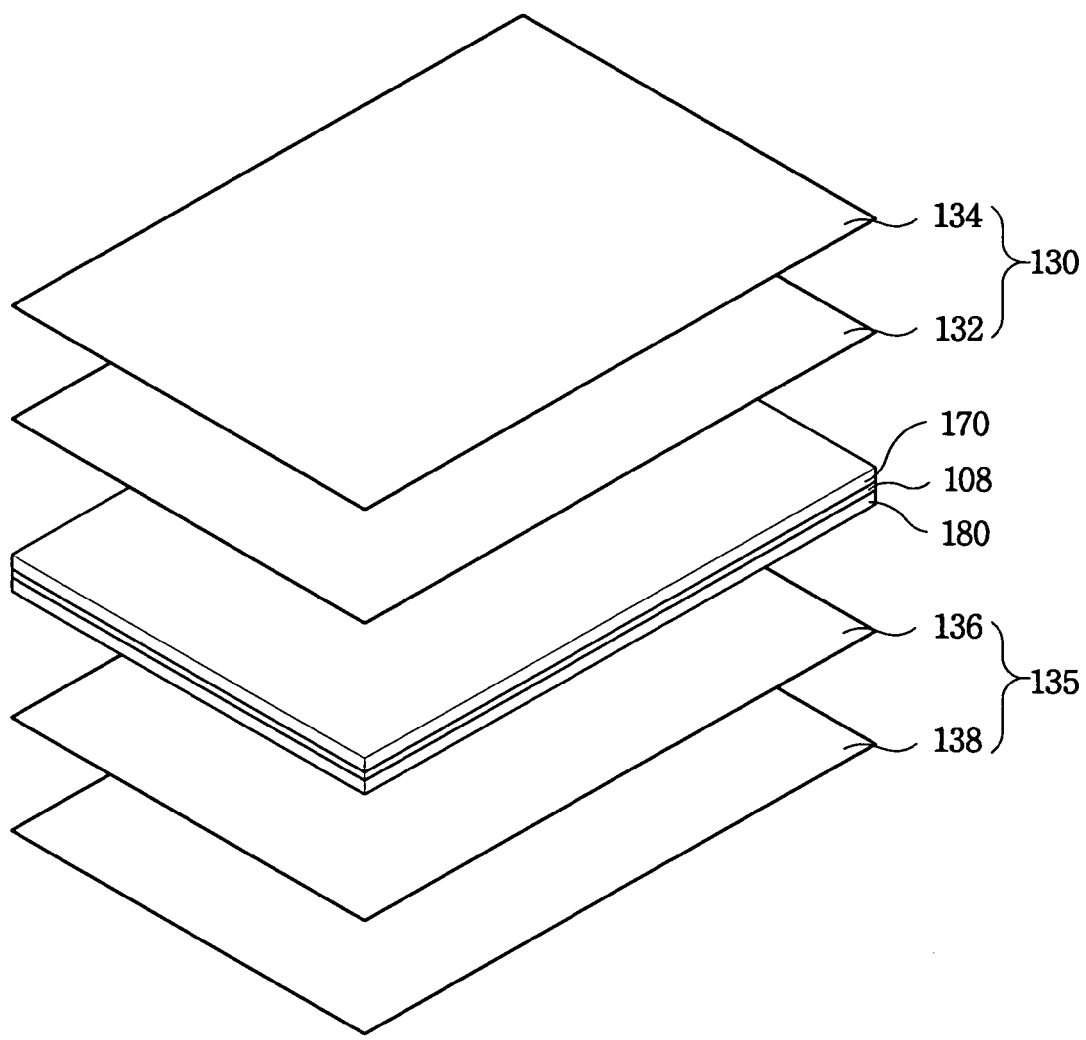
FIG. 4 is a schematic exploded perspective view showing a liquid crystal display apparatus according to a first exemplary embodiment of the present invention.
Figure 5:
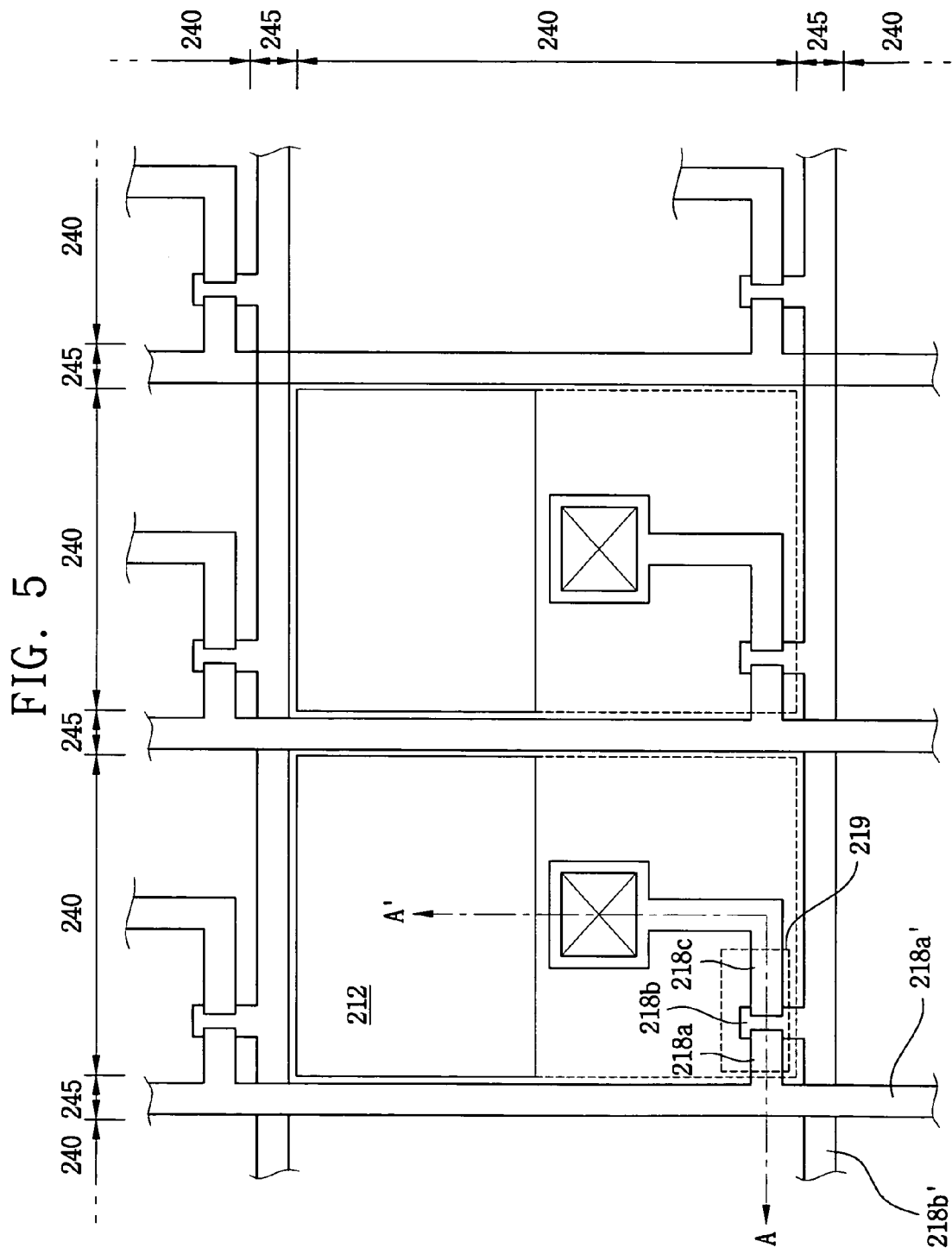
FIG. 5 is a schematic view showing the liquid crystal display apparatus of FIG. 4.
Figure 6:
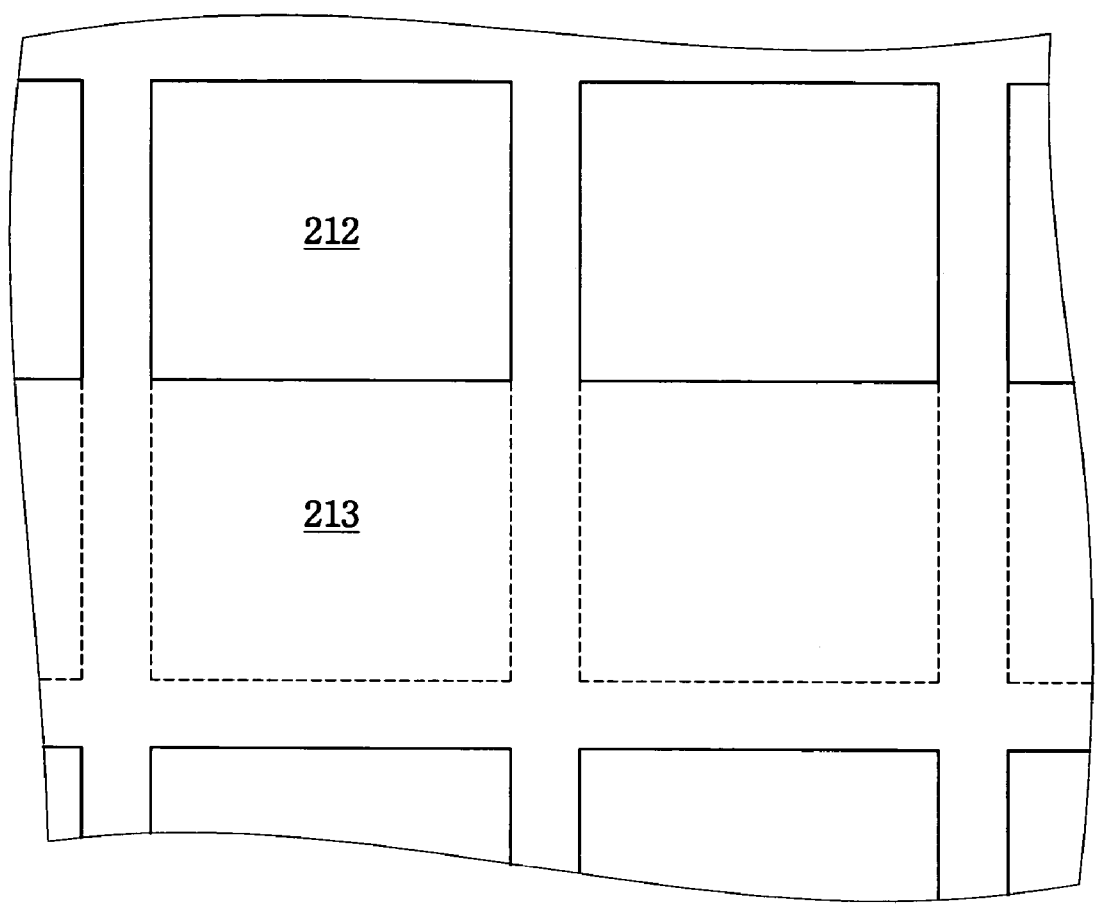
FIG. 6 is a plan view showing reflective and transparent electrodes of the liquid crystal display apparatus of FIG. 4.
Figure 7:
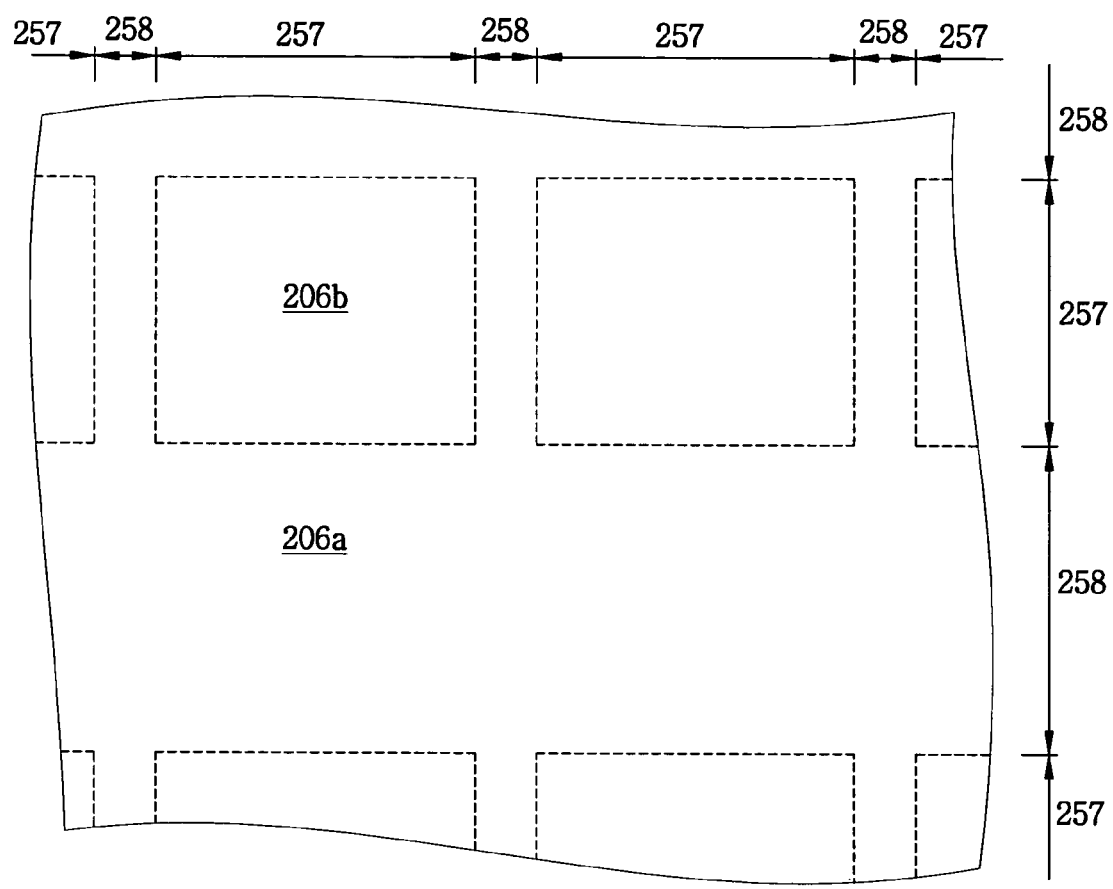
FIG. 7 is a plan view showing a common electrode of the liquid crystal display apparatus of FIG. 4.
Figure 8:
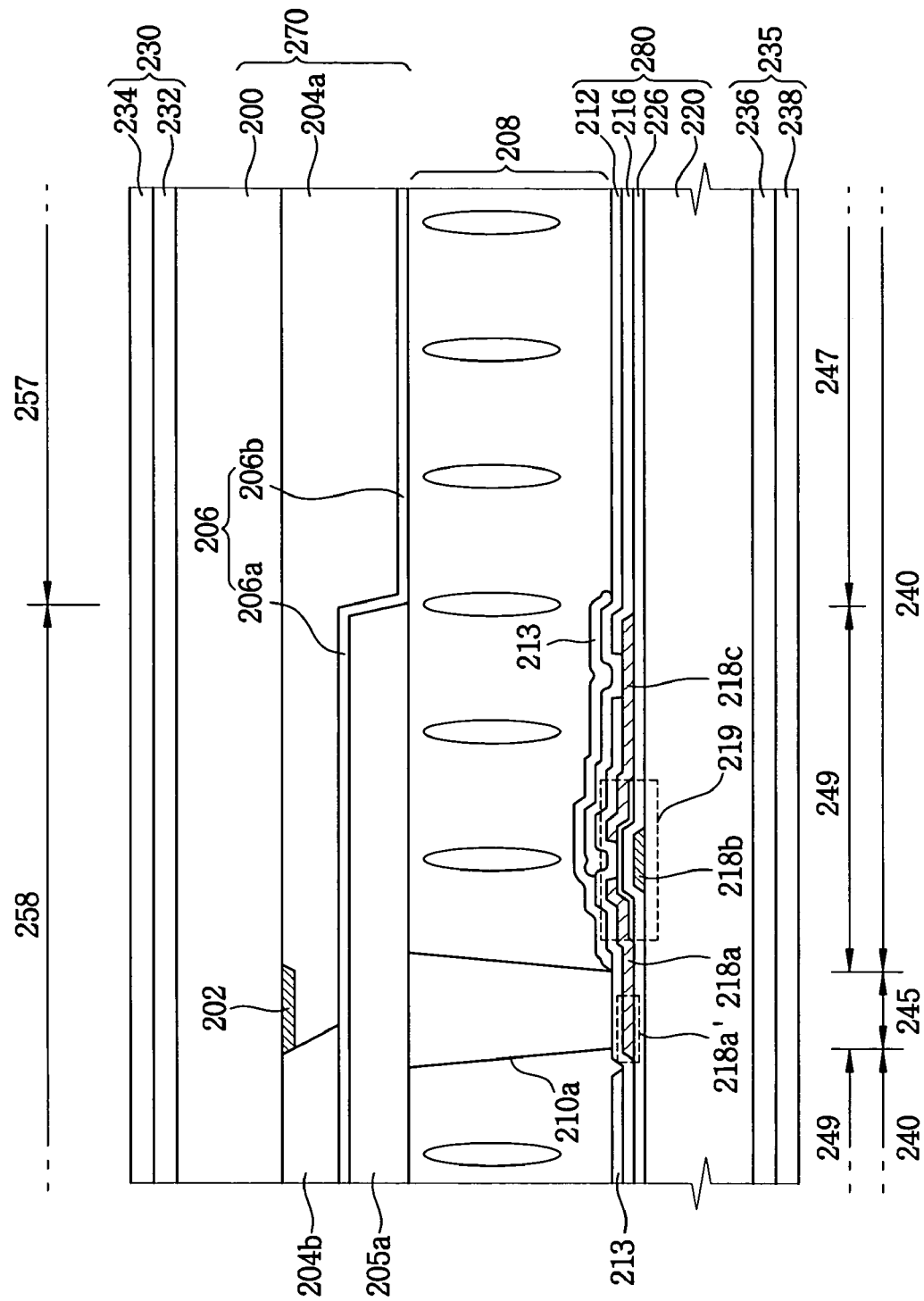
FIG. 8 is a cross-sectional view taken along the line B–B' of FIG. 5.

FIG. 4 is a schematic exploded perspective view showing a liquid crystal display apparatus according to a first exemplary embodiment of the present invention. FIG. 5 is a schematic view showing the liquid crystal display apparatus of FIG. 4. FIG. 6 is a plan view showing reflective and transparent electrodes of the liquid crystal display apparatus of FIG. 4. FIG. 7 is a plan view showing a common electrode of the liquid crystal display apparatus of FIG. 4, and FIG. 8 is a cross-sectional view taken along the line B–B' of FIG. 5.

Referring to FIGS. 4 to 8, a liquid crystal display apparatus according to a first exemplary embodiment of the present invention includes a liquid crystal display panel, an upper optical film assembly 230 and a lower optical film assembly 235.

The liquid crystal display panel includes a first substrate 270, a second substrate 280 and a liquid crystal layer 208. The first substrate 270 includes an upper substrate 200, a black matrix. 202, a color filters 204a and 204b, an overcoating layer 205a, a common electrode 206 and a spacer 210a. The first substrate 270 includes a transmissive region 257 and a reflective region 258. The second substrate 280 includes a lower substrate 220, a thin film transistor 219, a gate insulation layer 226, a passivation layer 216, an organic layer 214, a transparent electrode 212 and a reflective electrode 213. The second substrate 280 includes a pixel region 240 and a light blocking region 245. The pixel region 240 includes a red pixel region, a green pixel region and a blue pixel region.

The liquid crystal display apparatus adjust an arrangement of liquid crystal molecules of the liquid crystal layer 208 to display an image. The pixel region 240 includes a reflective electrode region 249 for reflecting an external light, and a transparent electrode region 247, through which a light generated from a backlight assembly (not shown) passes. The transmissive region 257 corresponds to the transparent electrode region 247. The reflective region 258 is adjacent to the transmissive region 257, and the reflective region 258 corresponds to the light blocking region 245 and the reflective electrode region 249. The reflective region 258 may only correspond to the reflective electrode region 249.

The thin film transistor 219 and the transparent electrode 212 are disposed in the reflective electrode region 249, and the reflective electrode 213 is disposed in the transparent electrode region 247.

The light blocking region 245 is disposed adjacent to the pixel region 240. A source line 218a', a gate line 218b', and a driving circuit (not shown) are disposed in the light blocking region 245.

The upper substrate 200 and the lower substrate 220 include a material that is transparent, for example, such as glass. The glass for the upper and lower substrates 200 and 220 does not include alkali ions. When the glass includes alkali ions, a resistivity of liquid crystal material in the liquid crystal layer 208 is lowered due to the alkali ions, leading to deteriorate a display quality. Additionally, the alkali ions lower a combining force between the sealant and the glass, and an operation of the thin film transistor is deteriorated.

The upper and lower substrates 200 and 220 may include triacetylcellulose (TAC), polycarbonate (PC), polyethersulfone (PES), polyethyleneterephthalte (PET), polyethylenenaphthalate (PEN), polyvinylalcohol (PVA), polymethylmethacrylate (PMMA), cyclo-olefin polymer (COP) etc.

Preferably, the upper and lower substrates 200 and 220 are optically isotropic.

The black matrix 202 is disposed on the upper substrate, such that the black matrix 202 is disposed in the light blocking region 245. The black matrix 202 blocks the light that passes the light blocking region 245 to enhance a display quality. The black matrix 202 may be formed by etching of metal or opaque organic material film. The metal may include chromium (Cr), chromium oxide (CrOx), chromium nitride (CrNx), etc., and the opaque organic material may include carbon black, pigment composition, dye composition etc. The pigment composition or the dye composition includes red colored composition, green colored composition and blue colored composition. An opaque material including photoresist may be coated on the upper substrate 200, and patterned to form the black matrix 202. A red color filter, a green color filter and a blue color filter may be overlapped to form the black matrix.

The color filters 204a and 204b are formed on the upper substrate 200 having the black matrix 202 is formed thereon to selectively transmit the light that has a specific wavelength. The color filters 204a and 204b include red color filter, green color filter and a blue color filter. The color filters 204a and 204b include a photo initiator, a monomer, a binder, a pigment, a disperser, a solvent, a photoresist, etc. The color filters 204a and 204b of the transmissive region 257 is thicker than the color filters 204a and 204b of the reflective region 258. Preferably, a thickness ratio of the color filters 204a and 204b of the transmissive region 257 to the color filters 204a and 204b of the reflective region 258 is from about 1.8:1 to about 2.2:1.

A light generated from the backlight assembly (not shown) passes through the color filters 204a and 204b of the transparent electrode region 247 once, and exits the liquid crystal display apparatus. However, an external light that enters the liquid crystal display apparatus via the color filters 204a and 204b of the reflective electrode region 249 is reflected on the reflective electrode toward the color filters 204a and 204b of the reflective electrode region 249, and exits the liquid crystal display apparatus via the color filters 204a and 204b of the reflective electrode region 249 again. Thus, a luminance of the transparent electrode region 247 is substantially same as a luminance of the reflective electrode region 249.

The common electrode 206 is disposed on the color filters 204a and 204b. The common electrode 206 of the transmissive electrode region 257 is higher than the common electrode 206 of the reflective region 258, with respect to a surface of the upper substrate 200. The common electrode 206 comprises an optically transparent and electrically conductive material, for example, such as indium tin oxide (ITO) and indium zinc oxide (IZO).

Thus, even though the cell gap of the reflective electrode region 249 is substantially same as the cell gap of the transparent electrode region 247, the common electrode having different heights in accordance with the reflective electrode region 249 and the transparent electrode region 247 generates different electric fields to the liquid crystal layer 208 in accordance with the reflective electrode region 249 and the transparent electrode region 247.

That is, a distance between the common electrode 206a of the reflective electrode region 249 and the reflective electrode 213 is larger than a distance between the common electrode 206b of the transparent electrode region 247 and the transparent electrode 212, so that the electric fields formed between the common electrode 206a of the reflective electrode region 249 and the reflective electrode 213 is weaker than the electric fields between the common electrode 206b of the transparent electrode region 247 and the transparent electrode 212.

Thus, when a reference voltage is applied to the common electrodes 206a and 206b, and a pixel voltage is applied to the reflective electrode 213 and the transparent electrode 212, the arrangement of the liquid crystal of the reflective electrode region 249 is different from the arrangement of the liquid crystal of the transparent electrode region 247.

A light generated from the backlight assembly (not shown) passes through the liquid crystal layer 208 of the transparent electrode region 247 once to exit the liquid crystal display apparatus. An external light enters the liquid crystal display apparatus via the liquid crystal layer 208 of the reflective electrode region 249 to be reflected on the reflected electrode 213 to exit the liquid crystal display apparatus via the liquid crystal layer 208 of the reflective electrode region 249. Thus, the external light passes through the liquid crystal layer 208 twice. However, the arrangement of the liquid crystal molecules of the reflective electrode region 249 is different from the arrangement of the liquid crystal molecules of the transparent electrode region 247. Thus, the optical characteristics of the light that exits the liquid crystal display apparatus via the transparent electrode region 247 become similar to the optical characteristics of the light that exits the liquid crystal display apparatus via the reflective electrode region 249.

The overcoating layer 205a is disposed on the common electrode 206a of the reflective region 258. The overcoating layer 205a protects the common electrode 206a and planarizes stepped portion of the color filters 204a and 204b. Preferably, the overcoating layer 205 may comprise thermosetting plastic such as acryl resin, polyimide, etc. The overcoating layer 205a may be formed on the common electrode 206b of the transmissive region 257. When the overcoating layer 205a is formed on the common electrode 206b of the transmissive region 257, the thickness of the overcoating layer 205a formed on the common electrode 206a becomes larger compared with forming the overcoating layer 205a on the reflective region only.

The spacer 210a is formed on the upper substrate having black matrix 202, color filter 204a and 204b, overcoating layer 205a, and common electrode 206. The spacer 210a maintains a cell gap between the first and second substrates 270 and 280. Preferably, the spacer 210a is disposed corresponding to the black matrix 202.

The spacer 210a may correspond to a column spacer, a ball spacer or a mixed spacer thereof.

The thin film transistor 219 is formed on the lower substrate 220. The thin film transistor 219 includes a source electrode 218a, a gate electrode 218b, a drain electrode 218c and a semiconducting layer pattern.

The driving circuit (not shown) applies data voltages to the source electrode 218a via a source line 218a', and the driving circuit applies scan signal to the gate electrode 218b via a gate line 218b'.

The storage capacitor (not shown) is formed on the lower substrate 220. The storage capacitor maintains voltage difference between the common electrode 206a of the reflective region 258 and the reflective electrode 213, or between the common electrode 206b of the transmissive region 257 and the transparent electrode 212. The storage capacitor (not shown) may be front end gate type or isolated wiring type.

The gate insulation layer 226 is formed on the lower substrate 220 having the gate electrode 218b formed thereon, so that the gate insulation layer 226 electrically insulates the gate electrode 218b from the source and drain electrodes 218a and 218c. The gate insulation layer 226 may comprise silicon nitride (SiNx).

The passivation layer 216 is disposed on the lower substrate 220 having the thin film transistor 219 formed thereon. The passivation layer 216 includes a contact hole for exposing a portion of the drain electrode 218c. The passivation layer may comprise silicon nitride (SiNx).

An organic layer (not shown) may be formed on the passivation layer 226.

The transparent electrode 212 is formed on the passivation layer 216 and an inner wall of the contact hole. Thus, the transparent electrode 212 is electrically connected to the drain electrode 218c. When the pixel voltage is applied to the transparent electrode 212, electric fields is formed between the transparent electrode 212 and the common electrode 206b to adjust an arrangement of liquid crystal molecules of the liquid crystal layer 208 of the transparent electrode region 247. Thus, a transmissivity of light is modulated to display an image. The transparent electrode 212 may comprise an optically transparent and electrically conductive material, such as indium tin oxide (ITO), indium zinc oxide (IZO), zinc oxide (ZO), etc.

The reflective electrode 213 is formed on the passivation layer 216 and a portion of the transparent electrode 212 to reflect external light. The reflective electrode 213 comprises electrically conductive material and is electrically connected to the drain electrode 218c via the transparent electrode 212.

The driving circuit (not shown) applies the pixel voltage to the transparent electrode 212 and the reflective electrode 213 via the thin film transistor 219. The electric fields are formed between the reflective electrode 213 and the common electrode 206a, and between the transparent electrode 212 and the common electrode 206b.

The liquid crystal layer 208 is interposed between the first and second substrates 270 and 280, and liquid crystal material of the liquid crystal layer 208 is sealed by the sealant (not shown).

The liquid crystal in the liquid crystal layer 208 may be aligned in various ways. Thus, the liquid crystal display apparatus may be classified into twisted nematic (TN) mode, super twisted nematic (STN) mode, mixed twisted nematic (MTN) mode, vertical alignment (VA) mode or electrically controlled birefringence (ECB) mode in accordance with the alignment of the liquid crystal.

For example, the liquid crystal is aligned to the vertical alignment mode.

An alignment film (not shown) may be formed on the first and second substrates 270 and 280 so as to align liquid crystal molecules by rubbing the alignment film (not shown).

The upper optical film assembly 230 includes an upper quarter-wave plate 232 and an upper polarizer 234. The upper quarter-wave plate 232 is disposed on an upper face of the upper substrate 200, and the upper quarter-wave plate 232 delays the phase of a light that passes through the upper quarter-wave plate 232 by $\lambda/4$. The upper polarizer 234 is disposed on the upper quarter-wave plate 232 to polarize the light that passes through the upper quarter-wave plate 232. The light having polarizing axis that is perpendicular to a polarizing axis of the upper polarizer 234 may not pass through the upper polarizer 234.

A protection film (not shown) may be disposed on an upper surface of the upper polarizer 234. The protection film may be interposed between the upper quarter-wave plate 232 and the upper polarizer 234, or between the upper quarter-wave plate 232 and the upper substrate 200.

The lower optical film assembly 235 includes a lower quarter-wave plate 236 and the lower polarizer 238. The lower quarter-wave plate 236 is disposed on an lower face of the lower substrate 220, and the lower quarter-wave plate 236 delays a phase of a light that passes through the lower quarter-wave plate 236 by $\lambda/4$. The lower polarizer 238 is disposed on the lower quarter-wave plate 236 to polarize the light that passes through the lower polarizer 238. The light having polarizing axis that is perpendicular to a polarizing axis of the lower polarizer 238 may not pass through the lower polarizer 238.

A protection film (not shown) may be disposed on a lower surface of the lower polarizer 238. The protection film may be interposed between the lower quarter-wave plate 236 and the lower polarizer 238, or between the lower quarter-wave plate 236 and the lower substrate 220.

The upper and lower optical film assemblies 230 and 235 face with each other, and the polarizing axis of the upper and lower polarizers 234 and 238 may be substantially perpendicular to each other.

FIGS. 9A to 9J are cross-sectional views showing a process of manufacturing the liquid crystal display apparatus of FIG. 4.

Figure 9A:
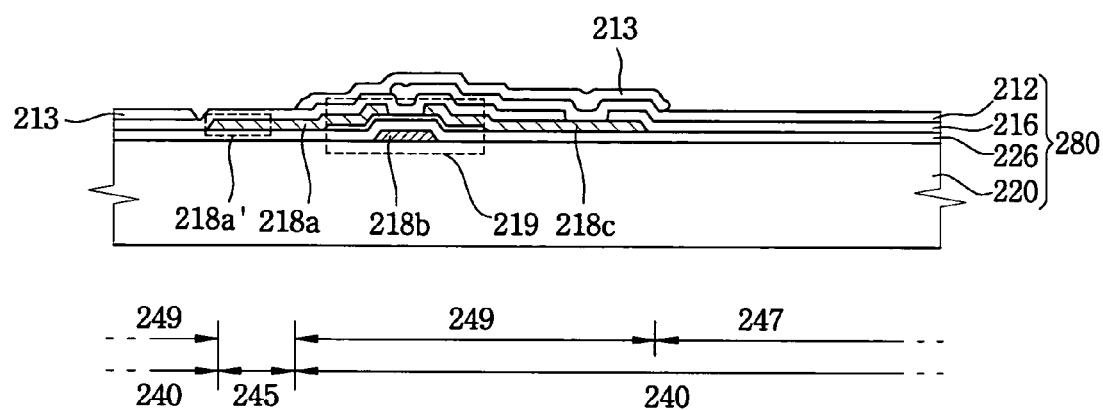
FIGS. 9A to 9J are cross-sectional views showing a process of manufacturing the liquid crystal display apparatus of FIG. 4.

Referring to FIG. 9A, a pixel region 240 for displaying an image and a light blocking region 245 for blocking a light are defined on a lower substrate 220. Additionally, a reflective electrode region 249 and a transparent electrode region 247 are defined in the pixel region 240.

Then, a thin film transistor 219, a gate line 218b' and a source line 218a' are formed on the lower substrate 220.

Then, a passivation layer 216 having a contact hole for exposing the drain electrode 218c of the thin film transistor 219 is formed on the lower substrate 220 having the thin film transistor 219 formed thereon.

Then, a transparent electrode 212 and the reflective electrode 213 are formed on the passivation layer 216 in both the transparent electrode region 247 and reflective electrode region 249.

Thus, a second substrate 280 including the lower substrate 220, the thin film transistor 219, the source line 218a', the gate line 218b' the transparent electrode 212 and the reflective electrode 213 is completed.

Figure 9B:
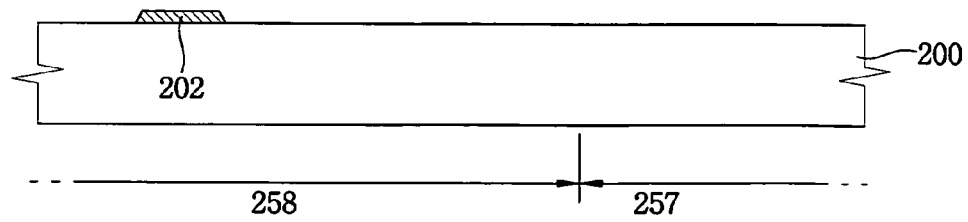

Referring to FIG. 9B, a black matrix 202 is formed on an upper substrate 200, such that the black matrix is disposed over the light blocking layer 245. A transmissive region 257 corresponding to the transparent electrode region 247, and a reflective region 258 corresponding to the light blocking region 245 and the reflective electrode region 249 are defined on the upper substrate 200.

Figure 9C:
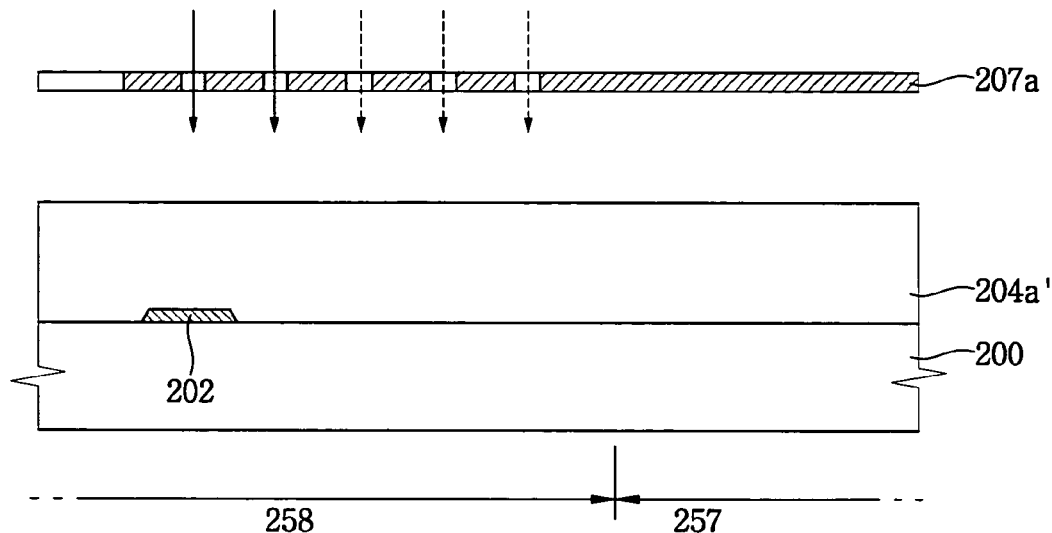

Referring to FIG. 9C, a red color filter composition 204a' is coated on the upper substrate 200 having the black matrix 202 formed thereon. The red color filter composition 204a' comprises a photo initiator, a monomer, a binder, a pigment, a disperser, a solvent, a photoresist, etc. Then, a red color filter mask 207a is disposed over the red color filter composition 204a'. The red color filter composition 204a' is exposed via the red color filter mask 207a. The red color filter mask 207a includes a transparent region, a semitransparent region and an opaque region. The transparent region of the red color filter mask 207a corresponds to a green color filter region, a blue color filter region, a light blocking region 245, and a peripheral region (not shown). The semitransparent region may be formed via silt or half tone substance, and the semitransparent region corresponds to the light blocking region 245, peripheral region (not shown) and the reflective electrode region 249 in a red pixel region. The opaque region corresponds to the transparent electrode region 247.

Figure 9D:
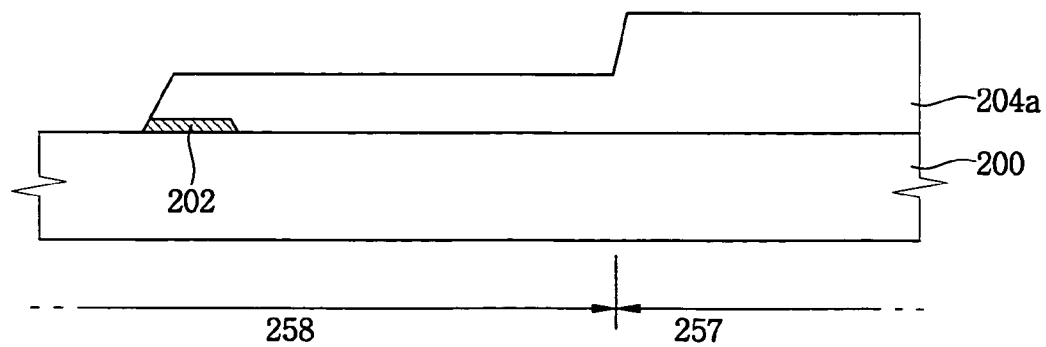

Referring to FIG. 9D, the red color filter composition is developed to form the red color filter 204a. The red color filter 204a of reflective electrode region 249 is thinner than the red color filter 204a of the transparent electrode region 247.

Figure 9E:
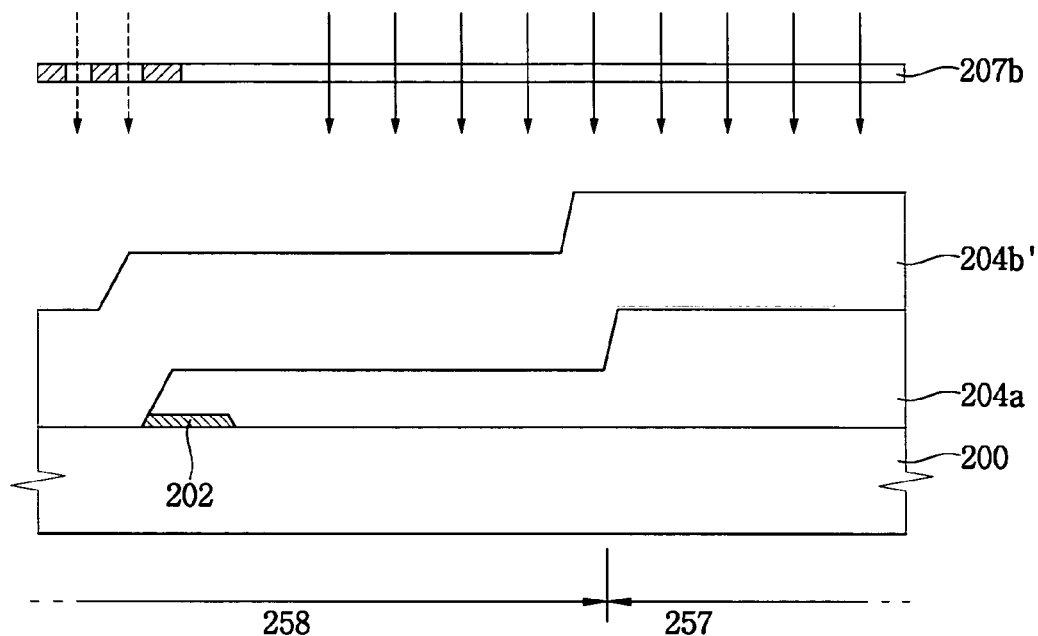

Referring to FIG. 9E, when the red color filter is completed, a green color filter composition 204b' is coated on the upper substrate 200. The green color filter composition 204b' comprises a photo initiator, a monomer, a binder, a pigment, a disperser, a solvent, a photoresist, etc. Then, a green color filter mask 207b is disposed over the green color filter composition 204b'. The green color filter composition 204b' is exposed via the green color filter mask 207b. The green color filter mask 207b includes a transparent region, a semitransparent region and an opaque region. The transparent region of the red color filter mask 207a corresponds to a red color filter region, a blue color filter region, a light blocking region 245, and a peripheral region (not shown). The semitransparent region may be formed via silt or half tone substance, and the semitransparent region corresponds to the reflective electrode region 249 in a green pixel region. The opaque region corresponds to the transparent electrode region 247.

Figure 9F:
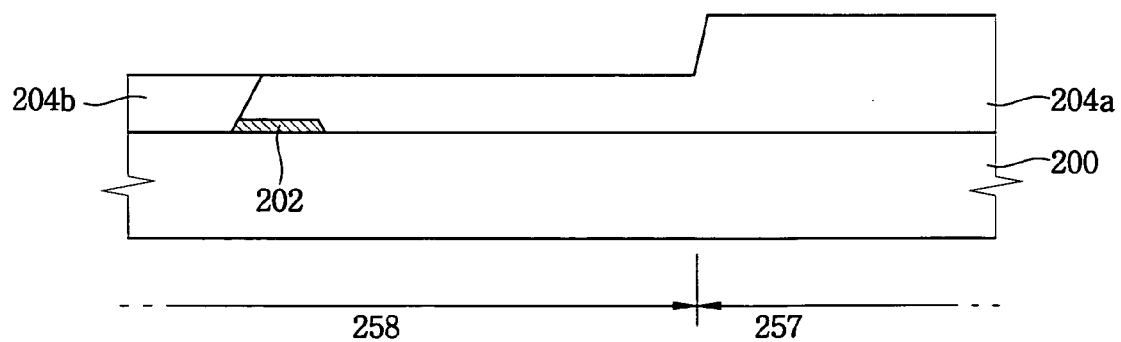

Referring to FIG. 9F, the green color filter composition is developed to form the green color filter 204b. The green color filter 204b of reflective electrode region 249 is thinner than the green color filter 204b of the transparent electrode region 247.

Then, a blue color filter (not shown) may be formed on the upper substrate 200 having the red and green color filter formed thereon via same procedure.

In the above, for example, the red, green and blue color filters are formed in sequence. The red, green and blue color filters may be formed in an arbitrary sequence.

Figure 9G:
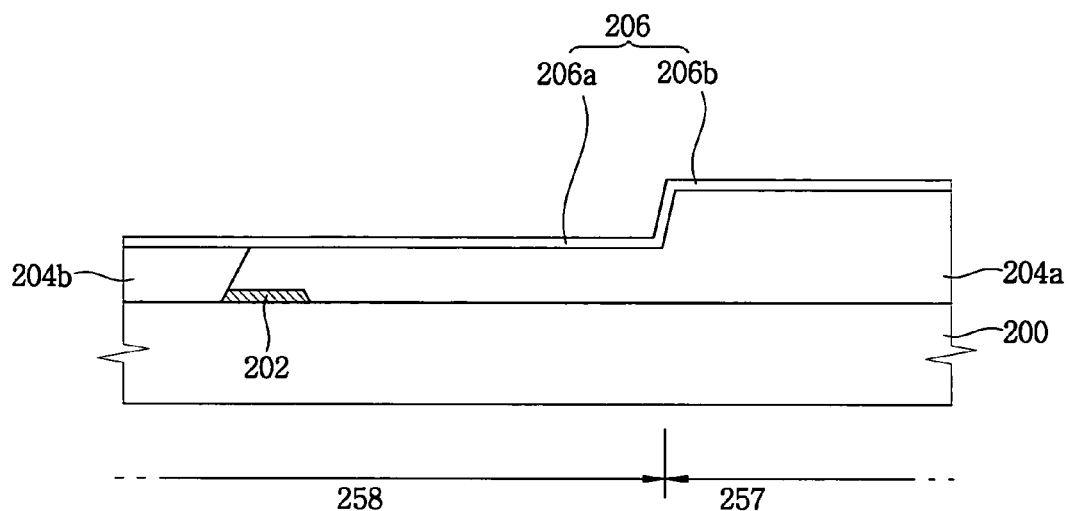

Referring to FIG. 9G, an optically transparent and electrically conductive material is coated on the color filters 204a and 204b to form the common electrode 206. The common electrode 206 of the transmissive region 257 is higher than the common electrode 206 of the reflective electrode region 258 with respect to a surface of the upper substrate 200.

Figure 9H:
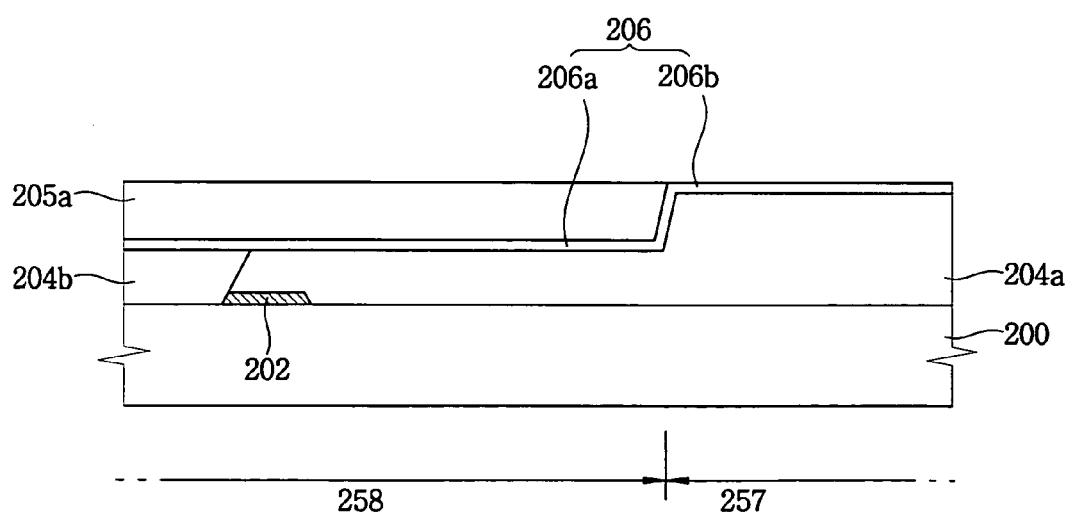

Referring to FIG. 9H, the thermosetting plastic including photoresist is coated on the common electrode 206. Then, the thermosetting plastic is exposed via a mask (not shown), and the thermosetting plastic is developed to the overcoating layer 205a. The overcoating layer 205a is disposed on the common electrode 206a of the reflective region 258.

Figure 9I:
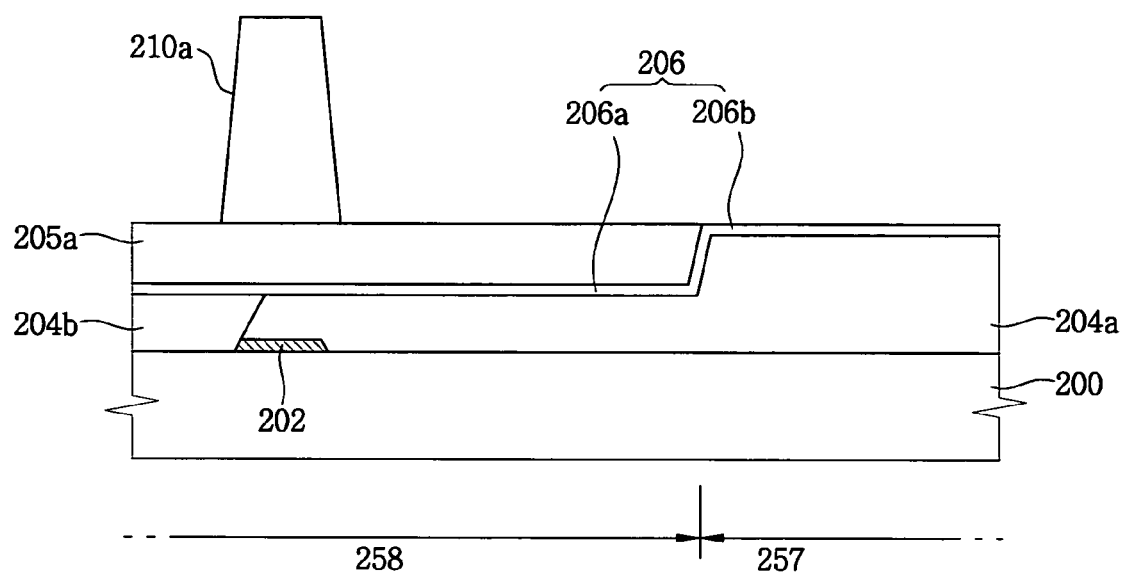

Referring to FIG. 9I, a thermosetting plastic is coated on the common electrode 206 and overcoating layer 205a, and the thermosetting plastic is exposed and developed to form a spacer 210a.

Thus, the first substrate 270 including the color filters 204a and 204b, the overcoating layer 205, the common electrode 206, and the spacer 210.

Figure 9J:
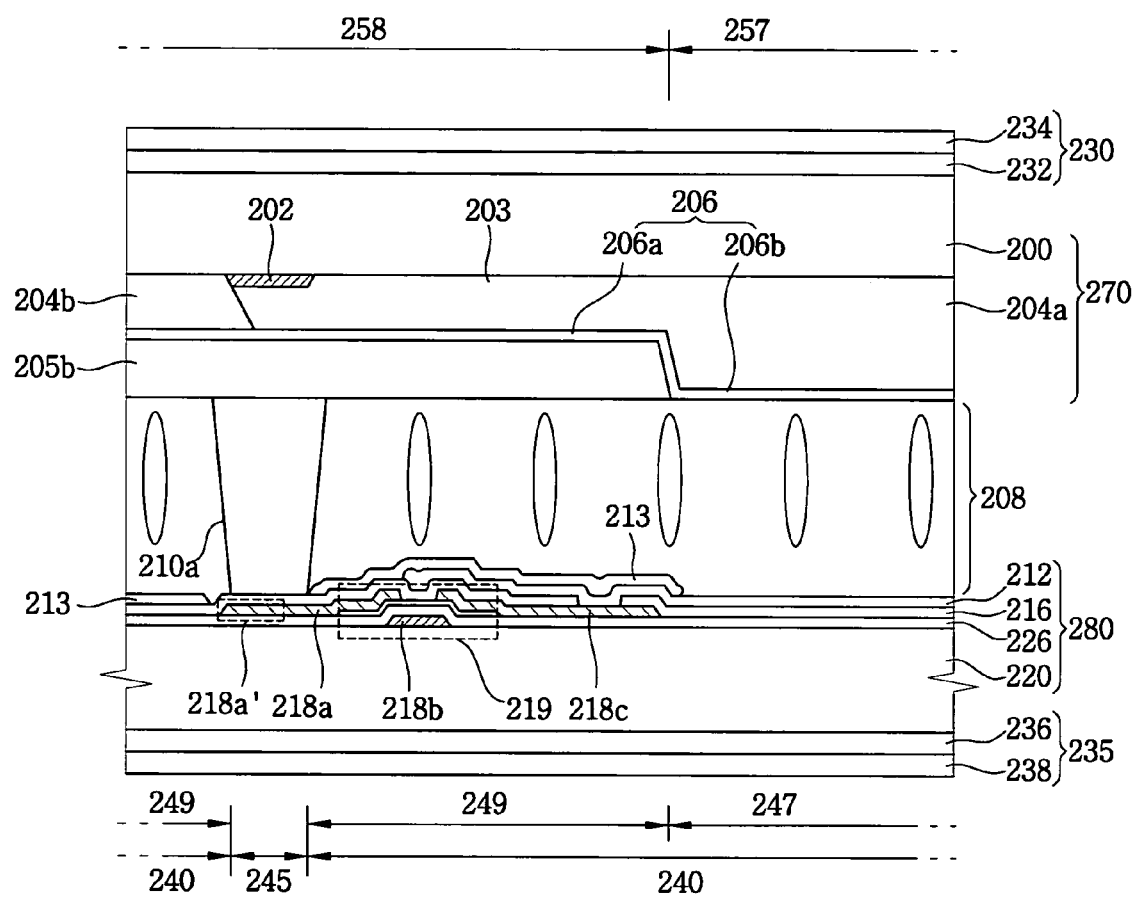

Referring to FIG. 9J, the first and second substrates 270 and 280 are assembled together, and liquid crystal material is injected into between the first and second substrates 270 and 280 to form the liquid crystal layer 208. Thus, liquid crystal display panel is completed.

Then, the upper quarter-wave plates 232 and the upper polarizer 234 are attached on the upper surface of the liquid crystal display panel to form the upper optical film assembly 230, and the lower quarter-wave plates 236 and the lower polarizer 238 are attached on the upper surface of the liquid crystal display panel to form the lower optical film assembly 235.

The liquid crystal display apparatus includes color filters 204a and 204b, the common electrode 206, and the overcoating layer 205a. The color filters 204a and 204b of the transmissive region 257 is thicker than the color filters 204a and 204b of the reflective region 258. Thus, the common electrode 206 formed on the color filters 204a and 204b has different height. That is, the distance between the common electrode 206 of the reflective electrode region 249 and the reflective electrode 213 is larger than the distance between the common electrode 206 of the transparent electrode region 247 and the transparent electrode 212, so that the electric fields formed between the common electrode 206 of the reflective electrode region 249 and the reflective electrode 213 is weaker than the electric fields between the common electrode 206 of the transparent electrode region 247 and the transparent electrode 212. Thus, the luminance corresponding the transparent electrode region 247 and the reflective electrode region 249 becomes uniform.

Further, the overcoating layer 205a is only formed on the common electrode layer 206 to reduce manufacturing cost and to enhance productivity. Additionally, the color filters 204a and 204b do not include slit, so that the common electrode 206a formed in the reflective region 258 has uniform cross-section.

Embodiment 2

Figure 10:
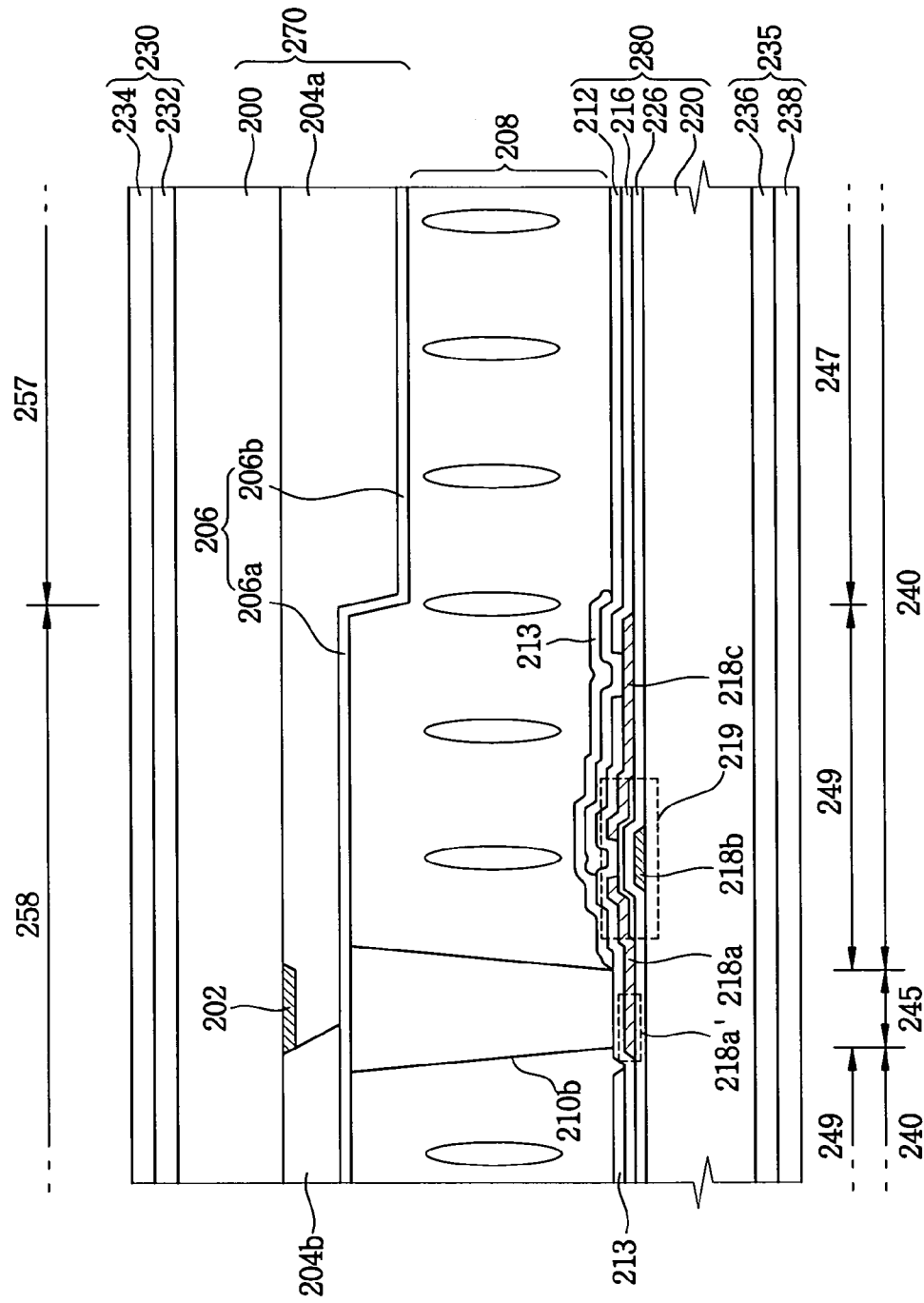
FIG. 10 is a cross-sectional view showing a liquid crystal display apparatus according to a second exemplary embodiment of the present invention.

FIG. 10 is a cross-sectional view showing a liquid crystal display apparatus according to the second exemplary embodiment of the present invention. The liquid crystal display apparatus of the present embodiment is the same as in Embodiment 1 except for a overcoating layer and a spacer. Thus, the same reference numerals will be used to refer to the same or like parts as those described in Embodiment 1 and any further explanation will be omitted.

Referring to FIG. 10, the liquid crystal display apparatus according to a second exemplary embodiment of the present invention includes a liquid crystal display panel, an upper optical film assembly 230 and a lower optical film assembly 235.

The liquid crystal display panel includes a first substrate 270, a second substrate 280 and a liquid crystal layer 208. The first substrate 270 includes an upper substrate 200, a black matrix 202, color filters 204a and 204b, a common electrode 206 and a spacer 210b.

The common electrode 206 is disposed on the color filters 204a and 204b. The common electrode 206 of the transmissive region 257 is higher than the common electrode 206 of the reflective region 258 with respect to the surface of the upper substrate 200.

The spacer 210b is formed on the common electrode 206, and the spacer 210b maintains a cell gap of the first and second substrates 270 and 280.

FIGS. 11A to 11E are cross-sectional views showing a process of manufacturing the liquid crystal display apparatus of FIG. 10.

Figure 11A:
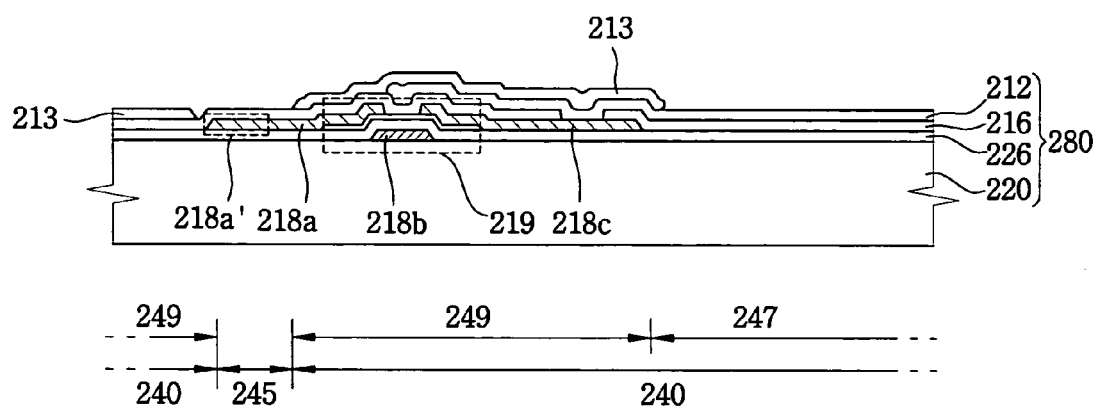
FIGS. 11A to 11E are cross-sectional views showing a process of manufacturing the liquid crystal display apparatus of FIG. 10.

Referring to FIG. 11A, a second substrate 280 including a lower substrate 220, a thin film transistor 219, a source line 218a', a gate line 218b', a transparent electrode 212 and a reflective electrode 213 is formed.

Figure 11B:
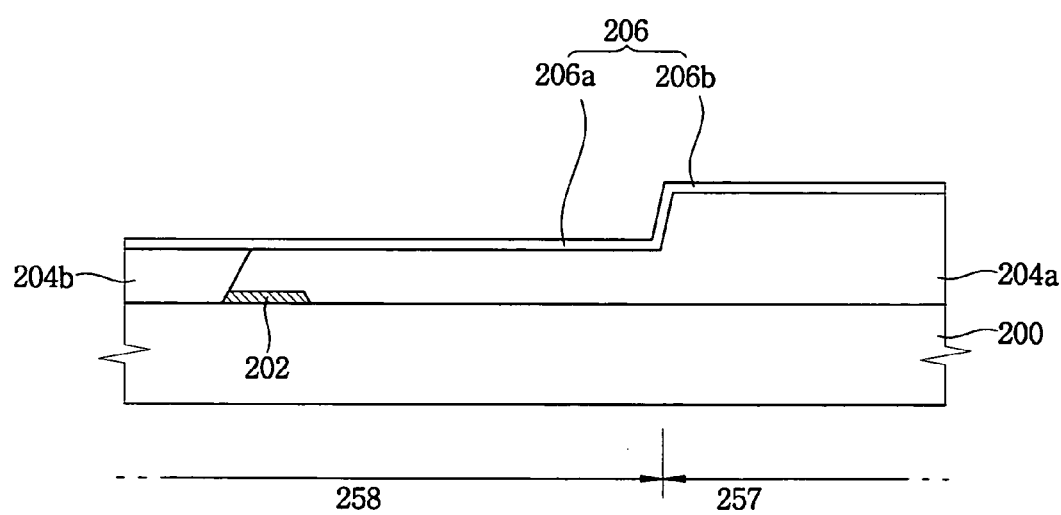

Referring to FIG. 11B, a black matrix 202, a color filters 204a and 204b, and a common electrode 206 is formed on an upper substrate 200, in sequence.

Figure 11C:
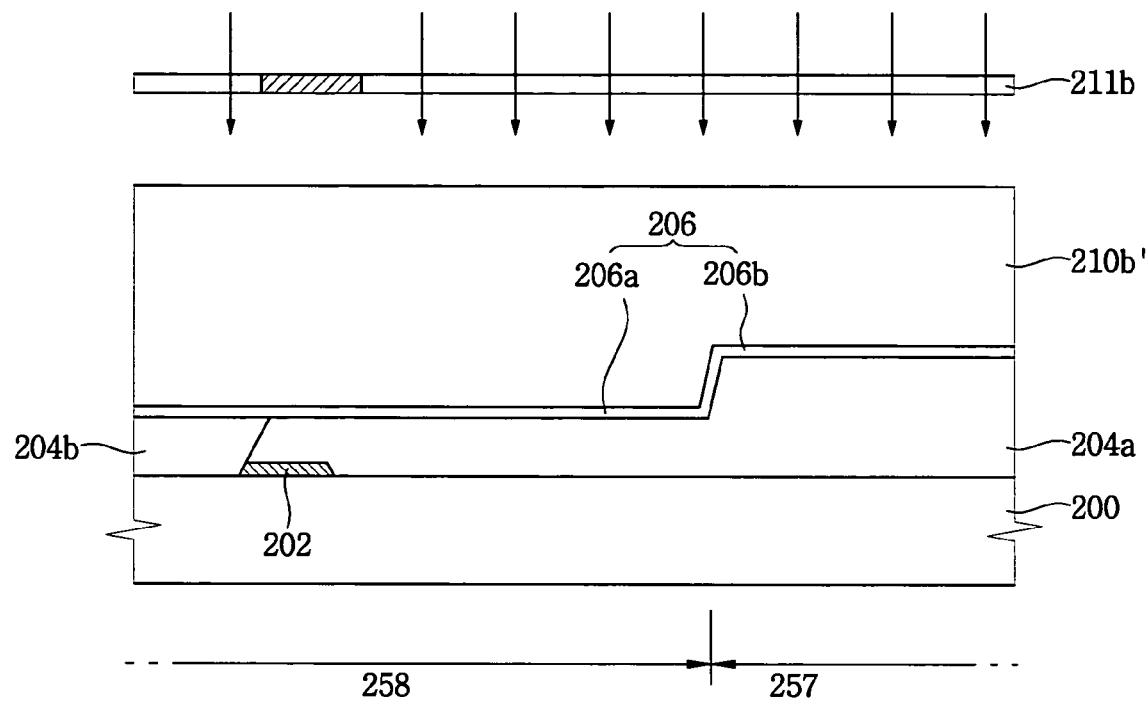

Referring to FIG. 11C, a material 210b' that includes photoresist is coated on the common electrode 206. Then, a mask 211b is disposed over the material 210b', and the material 210b' is exposed. The mask 211b includes a transparent portion and an opaque portion. The opaque portion corresponds to the spacer 210b.

Figure 11D:
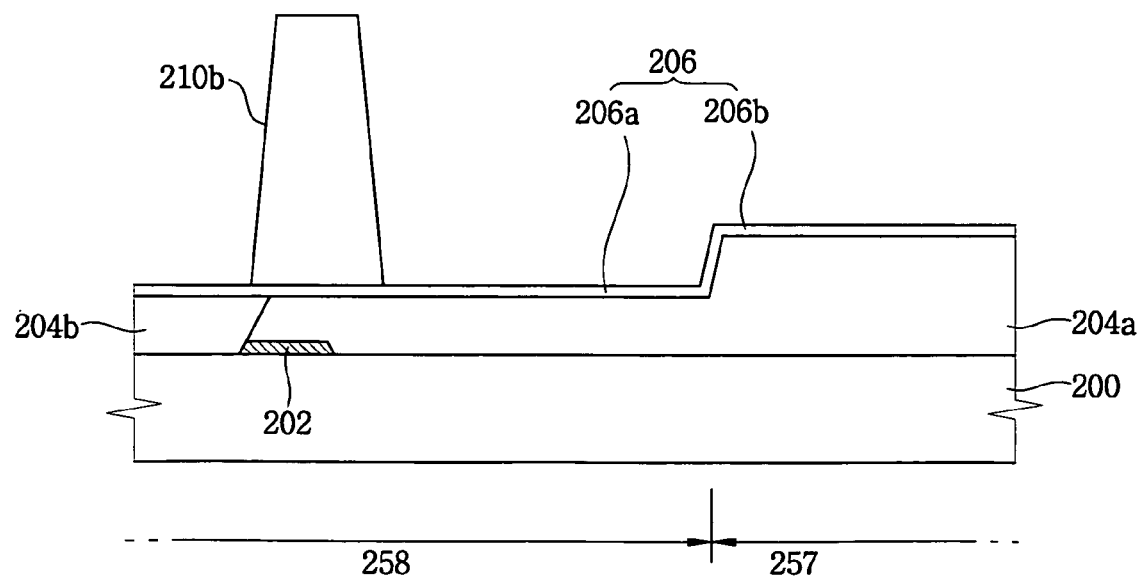

Referring to FIG. 11D, the material 210b' is developed to form a spacer 210b. Thus, a first substrate 270 including the black matrix 202, the color filter 204a and 204b, the common electrode 206 and the spacer 210b is completed.

Figure 11E:
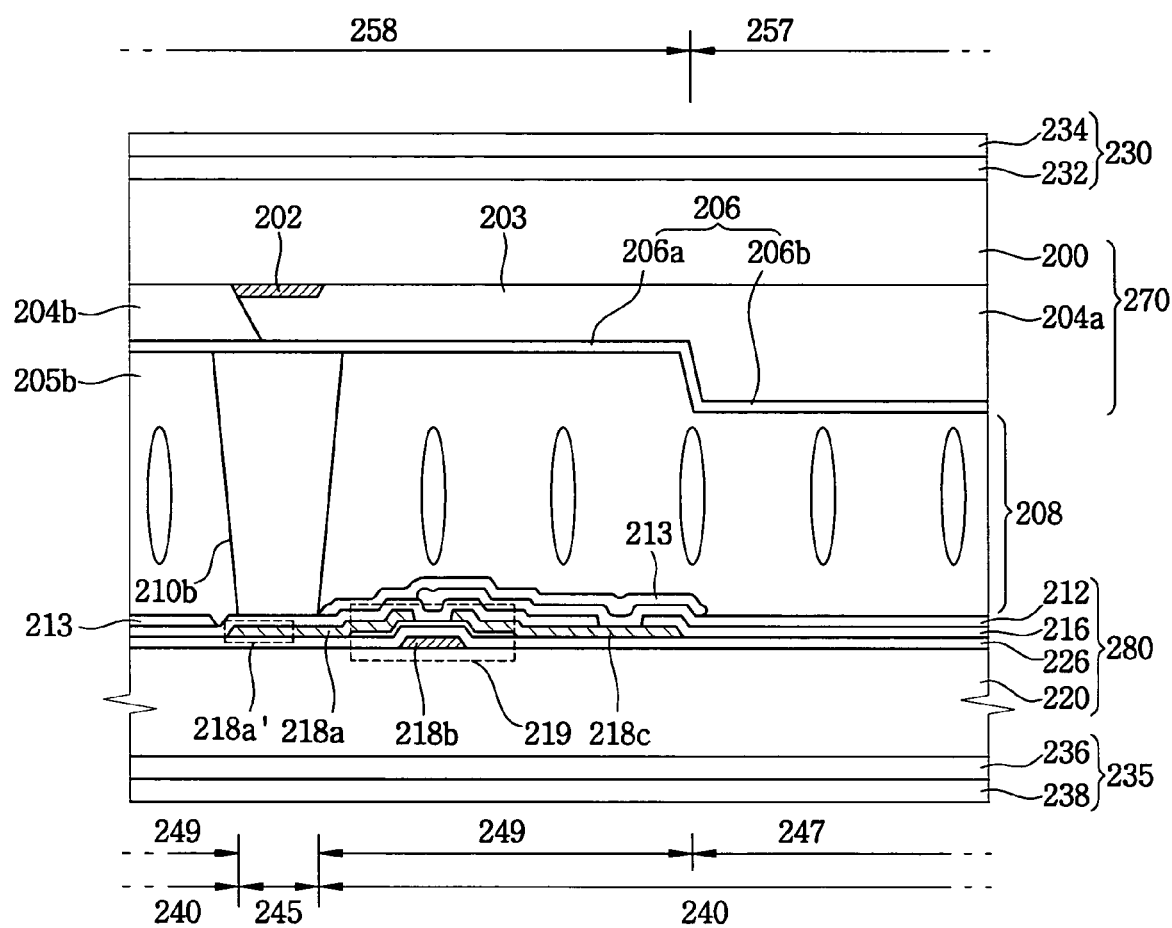

Referring to FIG. 11E, the first and second substrates 270 and 280 are assembled together, and liquid crystal material is injected into between the first and second substrates 270 and 280 to form a liquid crystal layer 208. Then, upper and lower optical film assemblies 230 and 235 are formed on an upper surface of the upper substrate 200 and a lower surface of the lower substrate 220, respectively.

According to the present embodiment, an overcoating layer is not formed on the common electrode 206. However, a spacer 210b is formed on the common electrode 206 of the light blocking region 245. Thus, a manufacturing process is simplified.

Embodiment 3

Figure 12:
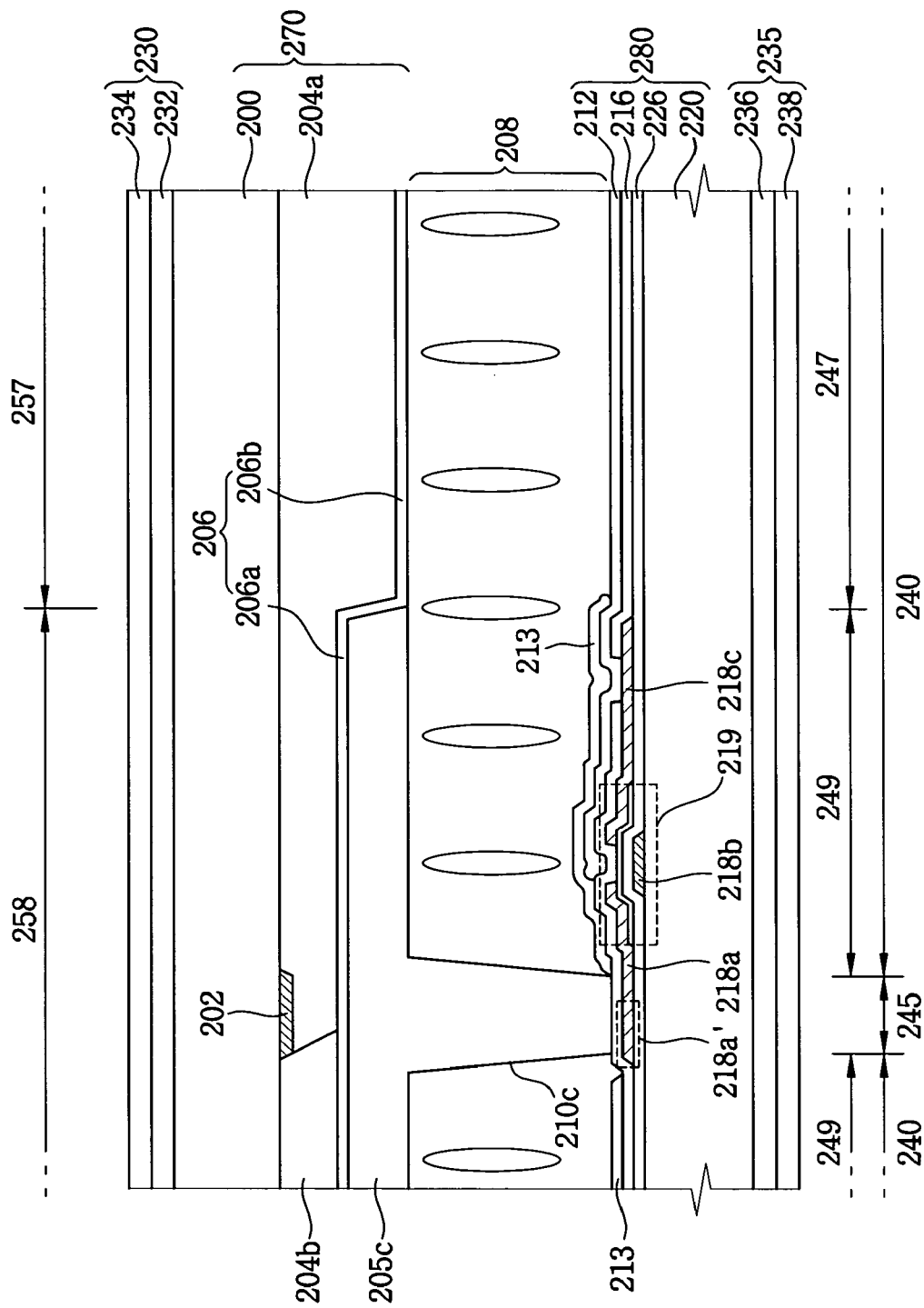
FIG. 12 is a cross-sectional view showing a liquid crystal display apparatus according to a third exemplary embodiment of the present invention.

FIG. 12 is a cross-sectional view showing a liquid crystal display apparatus according to the third exemplary embodiment of the present invention. The liquid crystal display apparatus of the present embodiment is same as in Embodiment 1 except for an overcoating layer and a spacer. Thus, the same reference numerals will be used to refer to the same or like parts as those described in Embodiment 1 and any further explanation will be omitted.

Referring to FIG. 12, a liquid crystal display apparatus according to the third exemplary embodiment of the present invention includes a liquid crystal display panel, an upper optical film assembly 230 and a lower optical film assembly 235.

The liquid crystal display panel includes a first substrate 270, a second substrate 280 and a liquid crystal layer 208. The first substrate 270 includes an upper substrate 200, a black matrix 202, a color filters 204a and 204b, an overcoating layer 205c, a common electrode 206 and a spacer 210c.

The common electrode 206 is disposed on the color filters 204a and 204b. The common electrode 206b of the transmissive region 257 is higher than the common electrode 206a of the reflective region 258 with respect to the upper substrate 200.

The overcoating layer 205c is disposed on the common electrode 206a of the reflective region 258. The spacer 210c is formed on the overcoating layer 205c, such that the spacer 210c is integrally formed with the overcoating layer 205c. Thus, the spacer 210c comprises same material as the overcoating layer 205c. The spacer 210c and the overcoating layer 205c comprise a thermosetting plastic, for example, such as acryl resin, polyimide, etc.

The overcoating layer 205c planarizes the surface of the first substrate 270 to make the alignment of the liquid crystal molecules in the liquid crystal layer 208 uniform.

FIGS. 13A to 13E are cross-sectional views showing a process of manufacturing the liquid crystal display apparatus of FIG. 12.

Figure 13A:
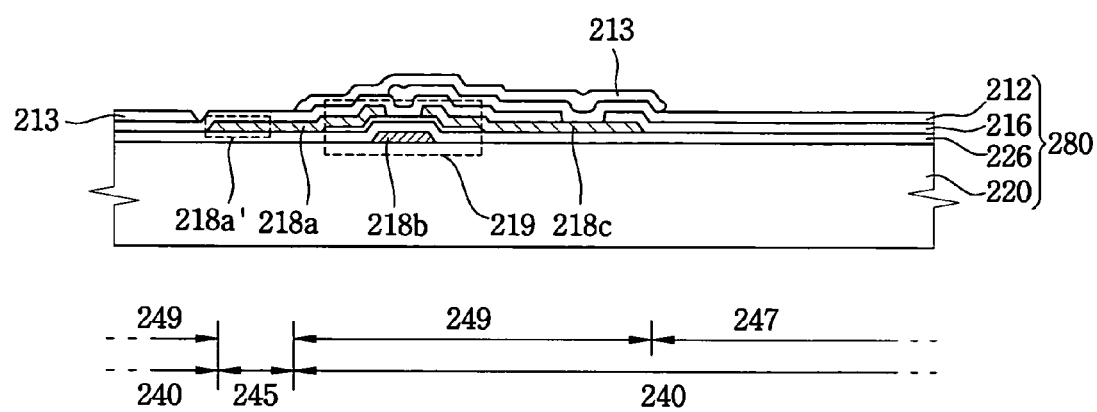
FIGS. 13A to 13E are cross-sectional views showing a process of manufacturing the liquid crystal display apparatus of FIG. 12.

Referring to FIG. 13A, a second substrate 280 including a lower substrate 220, a thin film transistor 219, a source line 218a', a gate line 218b' a transparent electrode 212 and a reflective electrode 213 is formed.

Figure 13B:
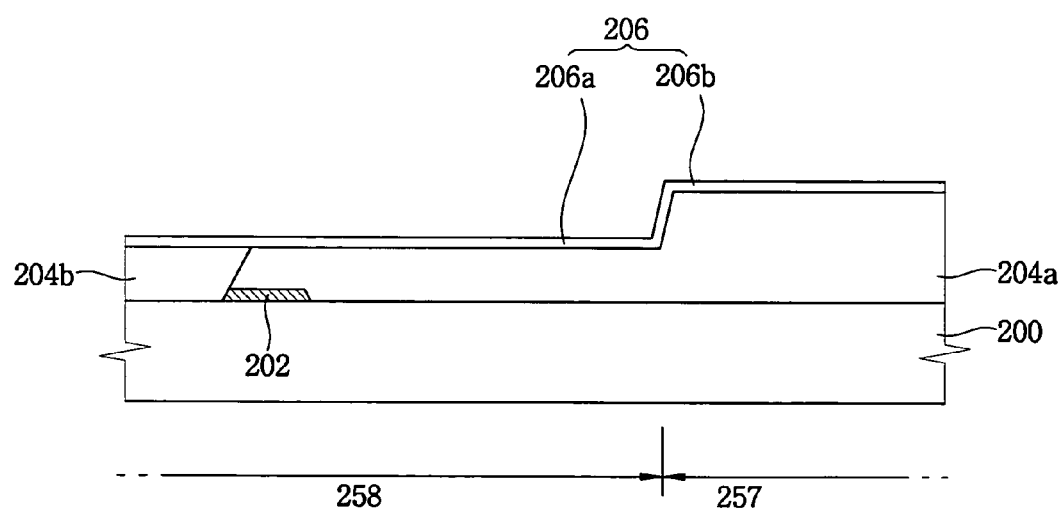

Referring to FIG. 13B, a black matrix 202, a color filter 204a and 204b, and a common electrode 206 are formed on the upper substrate 200 in sequence.

Figure 13C:
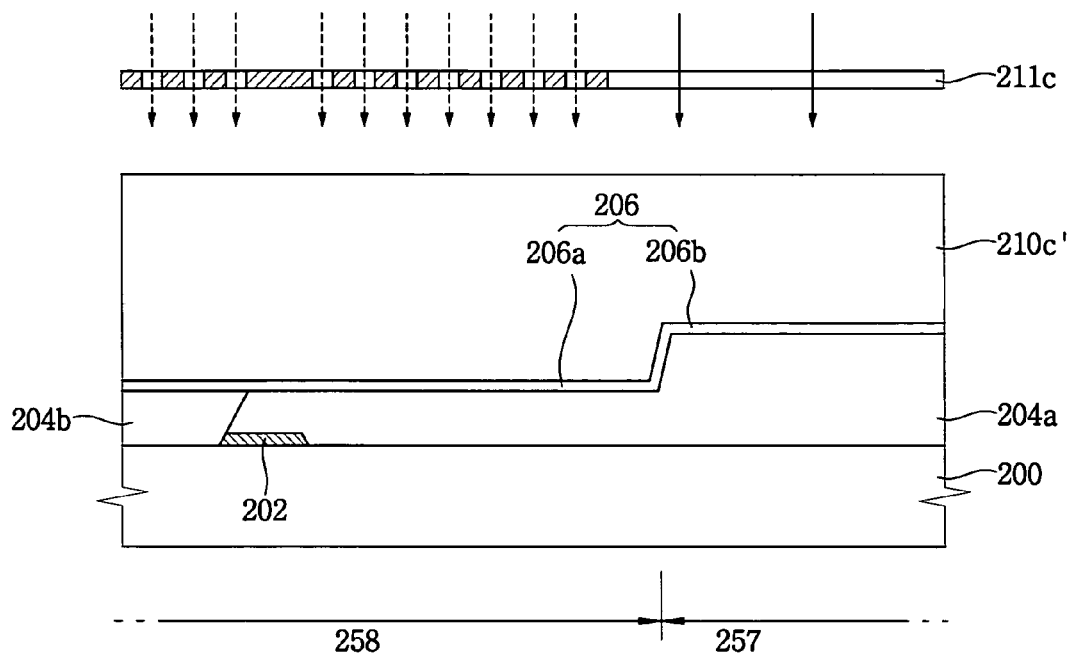

Referring to FIG. 13C, a thermosetting plastic comprising photoresist is coated on the common electrode 206. Then, the thermosetting plastic is exposed via a mask 211c. The mask 211c includes a transparent region, a semitransparent region and an opaque region. The transparent region corresponds to transmissive region 257. The opaque region corresponds to the spacer 210c, and the semitransparent region corresponds to the reflective region 258.

Figure 13D:
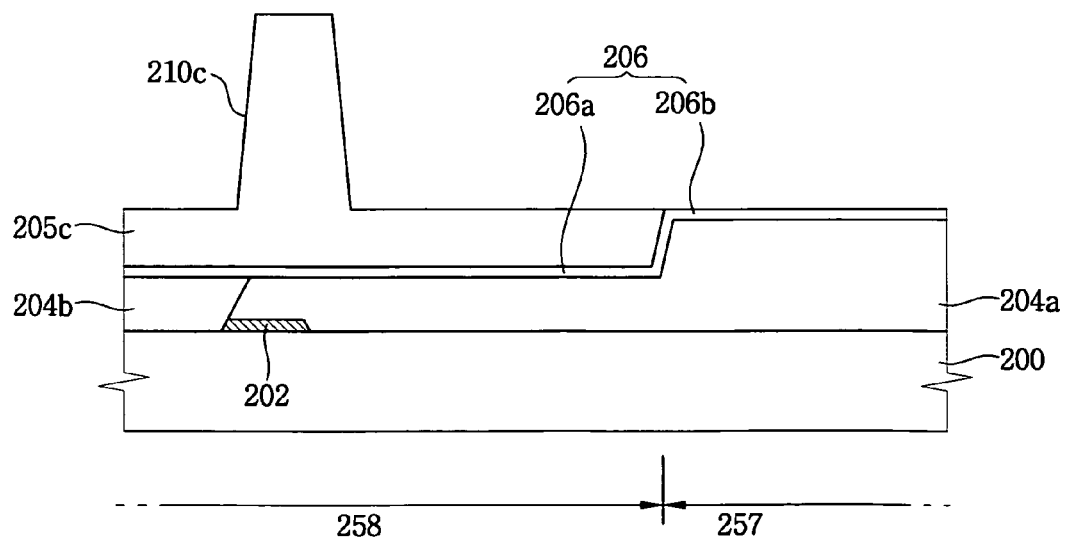

Referring to FIG. 13D, the thermosetting plastic that is exposed is developed to form the overcoating layer 205c and the spacer 210c simultaneously.

Thus, the first substrate 270 including the black matrix 202, the color filters 204a and 204b, the common electrode 206, the overcoating layer 205c and the spacer 210c is completed.

Figure 13E:
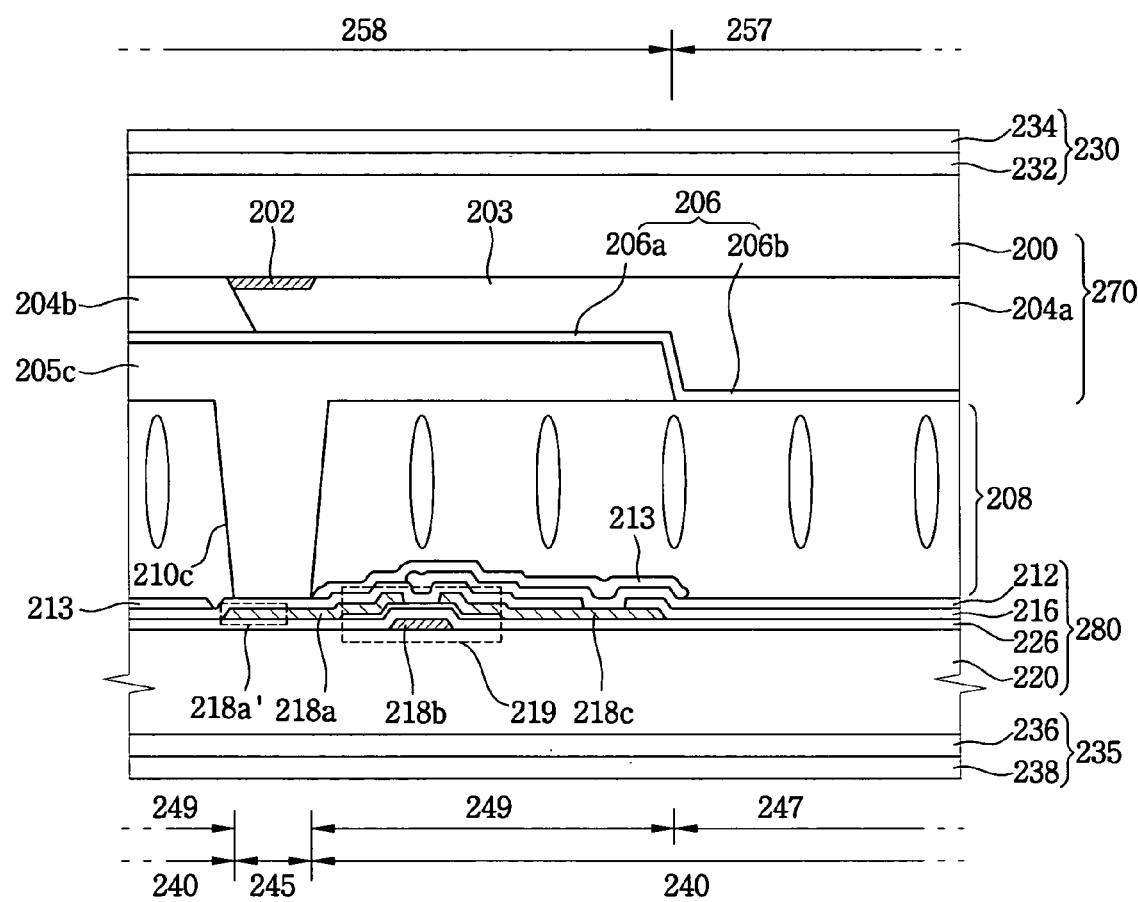

Referring to FIG. 13E, the first and second substrates 270 and 280 are assembled together, and liquid crystal material is injected into between the first and second substrates 270 and 280 to form the liquid crystal layer 208. Thus, the liquid crystal display panel is completed.

Then, the upper optical film assembly 230 and the lower optical film assembly are formed on upper and lower surface of the liquid crystal display panel.

According to the present embodiment, the spacer 210c is integrally formed with the overcoating layer 205c to simplify the manufacturing process.

Embodiment 4

Figure 14:
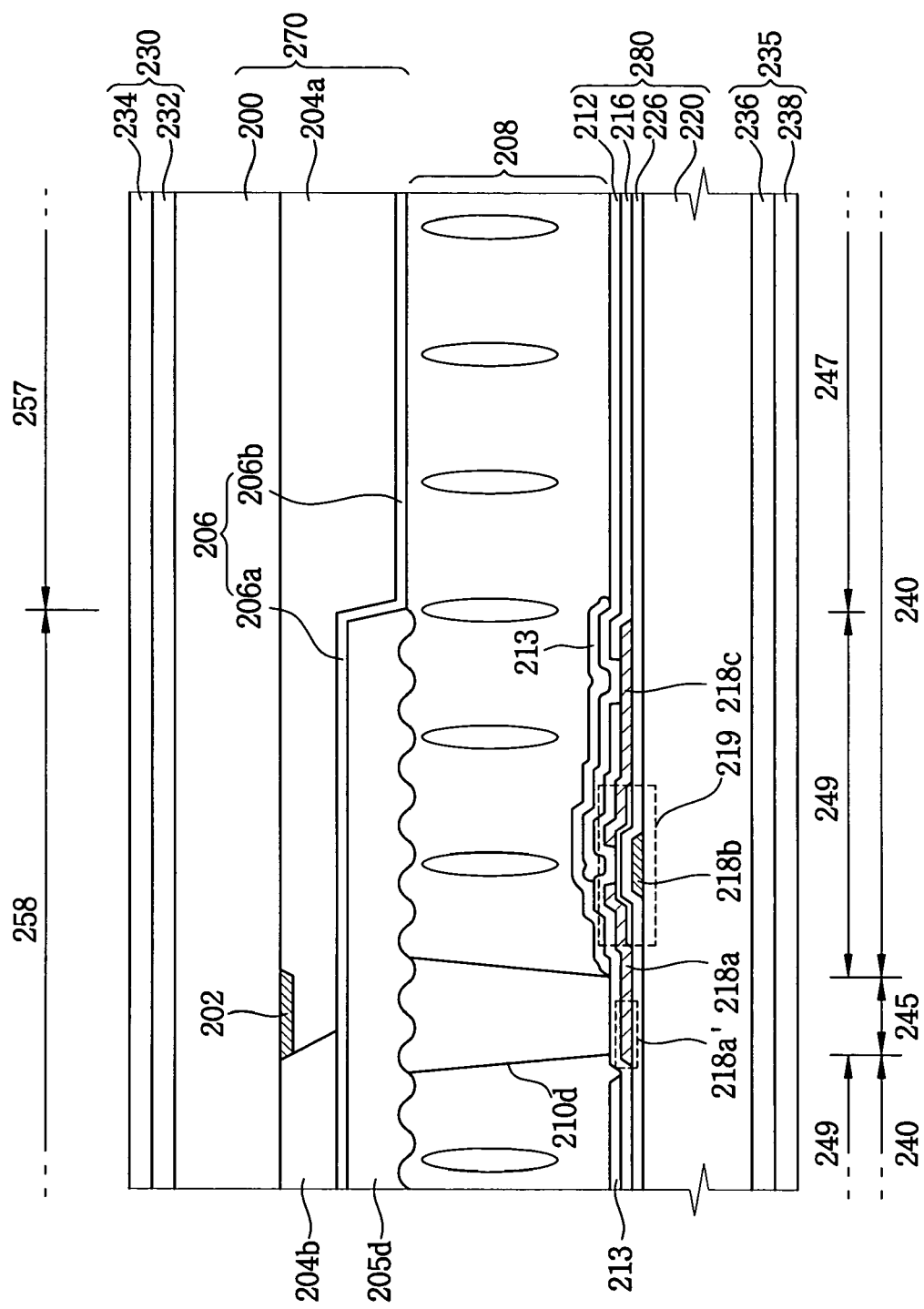
FIG. 14 is a cross-sectional view showing a liquid crystal display apparatus according to a fourth exemplary embodiment of the present invention.

FIG. 14 is a cross-sectional view showing a liquid crystal display apparatus according to the fourth exemplary embodiment of the present invention. The liquid crystal display apparatus of the present embodiment is the same as in Embodiment 1 except for an overcoating layer. Thus, the same reference numerals will be used to refer to the same or like parts as those described in Embodiment 1 and any further explanation will be omitted.

Referring to FIG. 14, a liquid crystal display apparatus according to a fourth exemplary embodiment of the present invention includes a liquid crystal display panel, an upper optical film assembly 230 and a lower optical film assembly 235.

The liquid crystal display panel includes a first substrate 270, a second substrate 280 and a liquid crystal layer 208. The first substrate 270 includes an upper substrate 200, a black matrix 202, color filters 204a and 204b, an overcoating layer 205d, a common electrode 206 and a spacer 210d.

The common electrode 206 is disposed on the color filters 204a and 204b. The common electrode 206b corresponding to the transmissive region 257 is higher than the common electrode 206a corresponding to the reflective region 258 with respect to the upper substrate 200.

The overcoating layer 205d is disposed on the common electrode 206a corresponding to the reflective region 258. The overcoating layer 205d includes embossing portion. The embossing portion enhances optical properties of the light of the reflective electrode region 249.

Hereinafter, a method of forming the overcoating layer 205d including the embossing portion will be explained.

A thermosetting plastic comprising photoresist is coated on the common electrode 206.

Then, the thermosetting plastic is exposed via a mask (not shown). The mask includes a transparent region and a semitransparent region. The transparent region corresponds to the transmissive region 257, and the semitransparent region corresponds to the reflective region 258. The semitransparent region of the mask (not shown) includes a plurality of slits.

Then, the thermosetting plastic is developed to form the overcoating layer 205d including the embossing portion.

The spacer 210d is disposed on the overcoating layer 205d.

According to the present embodiment, the overcoating layer 205d includes the embossing portion to enhance the optical properties of the light of the reflective electrode region 249.

Embodiment 5

Figure 15:
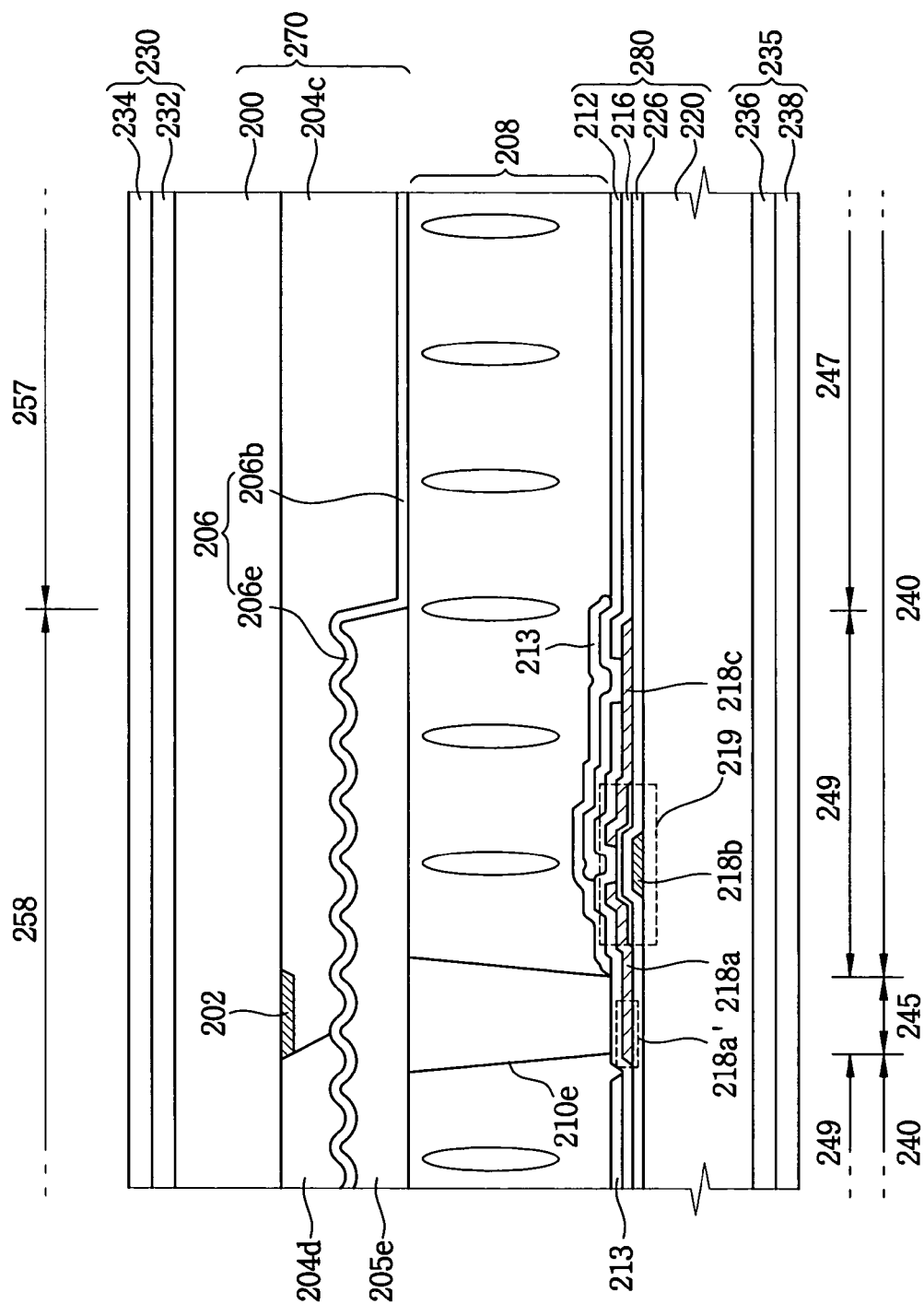
FIG. 15 is a cross-sectional view showing a liquid crystal display apparatus according to a fifth exemplary embodiment of the present invention.

FIG. 15 is a cross-sectional view showing a liquid crystal display apparatus according to a fifth exemplary embodiment of the present invention. The liquid crystal display apparatus of the present embodiment is same as in Embodiment 1 except for a color filter. Thus, the same reference numerals will be used to refer to the same or like parts as those described in Embodiment 1 and any further explanation will be omitted.

Referring to FIG. 15, a liquid crystal display apparatus according to a fifth exemplary embodiment of the present invention includes a liquid crystal display panel, an upper optical film assembly 230 and a lower optical film assembly 235.

The liquid crystal display panel includes a first substrate 270, a second substrate 280 and a liquid crystal layer 208. The first substrate 270 includes an upper substrate 200, a black matrix 202, color filters 204c and 204d, an overcoating layer 205e, a common electrode 206 and a spacer 210e.

The color filters 204c and 204d are formed on the upper substrate having the black matrix formed thereon. The color filters 204c and 204d selectively transmit the light having a specific wavelength. The color filter 204c of the transmissive region 257 is thicker than the color filter 204d of the reflective region 258. The color filter 204d includes embossing portion. The embossing portion enhances the optical properties of the light of the reflective electrode region 249.

Hereinafter, a method of forming color filters 204c and 204d having embossing portion will be explained.

A red color filter composition for forming a red color filter is coated on the upper substrate 200 having the black matrix 202 formed thereon. Then, the red color filter composition is exposed via a mask (not shown). The mask includes a transparent region, a semitransparent region and an opaque region. The transparent region corresponds to a green pixel region, a blue pixel region, a light blocking region (245) and a peripheral region (not shown). The semitransparent region includes slits, and the semitransparent region corresponds to the light blocking region 245, the peripheral region (not shown) and a reflective electrode region 249 of the red pixel region. The distance between the slits and the intensity of ultraviolet light may be adjusted so as to form embossing portion.

Then, the red color filter composition is developed to form the red color filter 204c.

Then, a green color filter and a blue color filter are formed in sequence. The red, green and blue color filters may be formed in an arbitrary sequence.

The common electrode 206 is formed on the color filters 204c and 204d. Thus, the common electrode 206e formed on the embossing portion 204d is formed to be embossed.

The overcoating layer 205e is disposed on the common electrode 206e corresponding to the reflective region 258.

According to the present embodiment, the color filters 204c and 204d include embossing portion to enhance the optical properties of the light of the reflective electrode region 249. Further, the first substrate 270 is planarized to make the alignment of the liquid crystal molecules of the liquid crystal layer 208 uniform.

According to the exemplary embodiment of the present invention, the liquid crystal display apparatus includes color filters of which thickness is different according to the regions. That is, the color filter of the transmissive region is thicker than the color filter of the reflective region. Thus, common electrode formed on the color filters has different height according to the regions. That is, the distance between the reflective electrode and the common electrode is longer than the distance between the transparent electrode and the common electrode to make the luminance of the light uniform.

Additionally, an overcoating layer is formed on the common electrode to reduce manufacturing cost and enhance productivity. Further, the color filters do not include slit, so that the common electrode of the reflective region has uniform cross section.

The overcoating layer may be omitted, or the spacer may be integrally formed with the overcoating layer to reduce the manufacturing cost.

The overcoating layer or the color filters may include embossing portion to enhance the optical properties of the light of the reflective electrode region.

Having described the exemplary embodiments of the present invention and its advantages, it is noted that various changes, substitutions and alterations can be made herein without departing from the spirit and scope of the invention as defined by appended claims.

What is claimed is:

1. A color filter substrate comprising:
   a substrate including a transmissive region and a reflective region that is adjacent to the transmissive region;
   a color filter formed on the substrate, the color filter including a first portion formed in the transmissive region, and a second portion formed in the reflective region, the first and second portions having different thickness from each other;
a common electrode disposed on the color filter, the common electrode including a third portion formed in the transmissive region and a fourth portion formed in the reflective region, the third portion having a first height and the fourth portion having a second height that is lower than the first height with respect to the substrate; and
an overcoating layer on the common electrode.

2. The color filter substrate of claim 1, wherein the first portion is thicker than the second portion.

3. The color filter substrate of claim 2, wherein the ratio of the first portion to the second portion is in a thickness range from about 1.8:1 to about 2.2:1.

4. The color filter substrate of claim 1, wherein the color filter includes an embossing portion that enhances optical properties.

5. The color filler substrate of claim 1, further comprising a spacer formed on the common electrode.

6. The color filter substrate of claim 1, wherein the overcoating layer is formed on the fourth portion of the common electrode.

7. The color filter substrate of claim 6, further comprising a spacer formed on the overcoating layer.

8. The color filter substrate of claim 7, wherein the overcoating layer includes an embossing portion that enhances optical property.

9. The color filter substrate of claim 7, wherein the overcoating layer and the spacer is integrally formed with each other.

10. The color filter substrate of claim 1, wherein the color filter further comprises a slit portion, and the slit portion is disposed over the fourth portion of the common electrode.

11. A method of manufacturing color filter substrate, comprising:
forming a color filter on a substrate that includes a transmissive region and a reflective region adjacent to the transmissive region, the color filter including a first portion formed in the transmissive region, and a second portion formed in the reflective region, the first and second portions having different thickness from each other;
forming a common electrode on the color filter, the common electrode including a third portion formed in the transmissive region, and a fourth portion formed in the reflective region, the third portion having a first height and the fourth portion having a second height that is lower than the first height with respect to the substrate; and
forming overcoating layer on the common electrode.

12. The method of claim 11, wherein the second portion includes embossing portion that enhances optical properties.

13. The method of claim 11, wherein the overcoating layer is formed by:
coating a material including a photoresist on the color filter;
exposing the material via mask;
developing the material to form the overcoating layer.

14. The method of claim 13, wherein the overcoating layer includes an embossing portion that enhances optical properties.

15. The method of claim 14, wherein the mask includes a slit.

16. The method of claim 11, farther comprising:
forming the overcoating layer on the common electrode; and
forming a spacer on the overcoating layer.

17. The method of claim 16, wherein the overcoating layer and the spacer are integrally formed with each other.

18. The method of claim 17, wherein the overcoating layer and the spacer are formed by:
coating a material including a photoresist on the color filter;
exposing the material via a mask including a transparent region, a semitransparent region and an opaque region; and
developing the material to form the overcoating layer and the spacer simultaneously.

19. A liquid crystal display panel comprising:
a first substrate including:
a substrate including a transmissive region and a reflective region that is adjacent to the transmissive region;
a color filter formed on the substrate, the color filter including a first portion formed in the transmissive region, and a second portion formed in the reflective region, the first and second portions having different thickness from each other;
a common electrode disposed on the color filter, the common electrode including a third portion formed in the transmissive region, and a fourth portion formed in the reflective region, the third portion having a first height and the fourth portion having a second height that is lower than the first height with respect to the substrate; and
an overcoating layer on the common electrode;
a second substrate facing the first substrate; and
a liquid crystal layer interposed between the first and second substrates.

20. The liquid crystal display panel of claim 19, wherein the first portion is thicker than the second portion.

21. The liquid crystal display panel of claim 20, wherein the ratio of the first portion to the second portion is in a thickness range from about 1.8:1 to about 2.2:1.

22. A method of forming a liquid crystal display panel, including:
forming a first substrate including i) a substrate including a transmissive region and a reflective region that is adjacent to the transmissive region, ii) a color filter formed on the substrate, the color filter including a first portion formed in the transmissive region, and a second portion formed in the reflective region, the first and second portions having different thickness from each other, iii) a common electrode disposed on the color filter, the common electrode including a third portion formed in the transmissive region, and a fourth portion formed in the reflective region, the third portion having a first height and the fourth portion having a second height that is lower than the first height with respect to the substrate; and iv) an overcoating layer on the common electrode;
forming a second substrate;
assembling the first and second substrates; and
forming a liquid crystal layer between the first and second substrates.

23. The method of claim 22, wherein the overcoating layer formed on the common electrode and a spacer formed on the common electrode are integrally formed with each other.

24. The method of claim 23, wherein the overcoating layer and the spacer are formed by:
   coating a material including a photoresist on the color filter;
   exposing the material via a mask including a transparent region, a semitransparent region and an opaque region; and
   developing the material to form the overcoating layer and the spacer simultaneously.

25. A liquid crystal display apparatus comprising:
   a first substrate including:
      a substrate including a transmissive region and a reflective region that is adjacent to the transmissive region;
      a color filter formed on the substrate, the color filter including a first portion formed in the transmissive region, and a second portion formed in the reflective region, the first and second portions having different thickness from each other;
      a common electrode disposed on the color filter, the common electrode including a third portion fanned in the transmissive region, and a fourth portion formed in the reflective region, the third portion having a first height and the fourth portion having a second height that is lower than the first height with respect to the substrate;
      an overcoating layer on the common electrode;
   a second substrate facing the first substrate;
   a liquid crystal layer interposed between thin first and second substrates;
   an upper optical film assembly disposed on an upper surface of the first substrate, the upper optical film assembly including an upper quarter-wave plate and an upper polarizer that is disposed on the upper quarter-wave plate; and
   a lower optical film assembly disposed on a lower surface of the second substrate, the lower optical film assembly including a lower quarter-wave plate and a lower polarizer that is disposed on the lower quarter-wave plate.

26. The liquid crystal display apparatus of claim 25, wherein the ratio of the first portion to the second portion is in a thickness range from about 1.8:1 to about 2.2:1.

27. A color filter substrate comprising:
   a substrate including a transmissive region and a reflective region that is adjacent to the transmissive region;
   a color filter formed on the substrate, the color filter including a first portion formed in the transmissive region, and a second portion formed in the reflective region, the first and second portions having different thickness from each other;
   a common electrode disposed on the color filter, the common electrode including a third portion formed in the transmissive region, and a fourth portion formed in the reflective region, the third portion and the fourth portion having different heights from each other with respect to the substrate;
   an overcoating layer fanned on the fourth portion of the common electrode; and
   a spacer formed on the overcoating layer.

28. The color filter substrate of claim 27, wherein the third portion of the common electrode has a first height, and the fourth portion of the common electrode has a second height tat is lower than the first height with respect to the substrate.

* * * * *